(12) United States Patent
Kiel et al.

(10) Patent No.: US 8,966,272 B2
(45) Date of Patent: Feb. 24, 2015

(54) METHOD FOR AUTHOR VERIFICATION AND SOFTWARE AUTHORIZATION

(75) Inventors: Jeffrey T. Kiel, Raleigh, NC (US); Andrei Leonid Osnovich, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 294 days.

(21) Appl. No.: 12/651,085

(22) Filed: Dec. 31, 2009

(65) Prior Publication Data

US 2010/0169654 A1    Jul. 1, 2010

Related U.S. Application Data

(62) Division of application No. 11/366,843, filed on Mar. 1, 2006.

(51) Int. Cl.
```
G06F 7/04      (2006.01)
H04L 9/32      (2006.01)
G06F 21/52     (2013.01)
```

(52) U.S. Cl.
CPC ............ *H04L 9/3247* (2013.01); *G06F 21/52* (2013.01); *H04L 9/3236* (2013.01)
USPC .......................................... 713/176; 726/30

(58) Field of Classification Search
USPC ................. 713/168–181; 726/21–33
See application file for complete search history.

(56) References Cited

U.S. PATENT DOCUMENTS

| | | | |
|---|---|---|---|
| 5,643,086 A | 7/1997 | Alcorn et al. | |
| 5,752,062 A | 5/1998 | Gover et al. | |
| 5,757,919 A * | 5/1998 | Herbert et al. | 713/187 |
| 5,815,154 A | 9/1998 | Hirschtick et al. | |
| 5,892,904 A | 4/1999 | Atkinson et al. | |
| 5,920,725 A | 7/1999 | Ma et al. | |
| 5,933,497 A * | 8/1999 | Beetcher et al. | 705/59 |
| 5,970,147 A | 10/1999 | Davis | |
| 5,978,484 A | 11/1999 | Apperson et al. | |
| 5,999,737 A * | 12/1999 | Srivastava | 717/162 |
| 6,016,474 A | 1/2000 | Kim et al. | |
| 6,157,618 A | 12/2000 | Boss et al. | |
| 6,266,416 B1 | 7/2001 | Sigbjørnsen et al. | |

(Continued)

OTHER PUBLICATIONS

"maxVUE Grapic Editor", Metso Automation, 2005, pp. 1-6, http://www.metsoautomation.com/automation/indes.nsf/FR?Readform&ATL=automation/ed_prod.nsf/WebWID/WTB-041110-22256F-2445A; eHB.

(Continued)

*Primary Examiner* — Eleni Shiferaw
*Assistant Examiner* — Phy Anh Vu

(57) ABSTRACT

Embodiments of the present invention are directed to a computer-implemented method for author verification and authorization of object code. In one embodiment, program object code is linked with a plurality of data blocks to create linked object code and a MAP file. Thereafter, author verification is performed by executing a plurality of comparisons between the linked object code and the MAP file. In another embodiment, a digital signing procedure is performed on linked object code by creating a signature data block. The signature data block is then encrypted and written to the linked object code to create digitally-signed object code. In another embodiment, an application program embodied in linked object code generates a data packet. The data packet is then compared to a previously-generated signature data packet from the linked object code to determine if the linked object code is authorized.

22 Claims, 16 Drawing Sheets

(56) References Cited

U.S. PATENT DOCUMENTS

| | | | |
|---|---|---|---|
| 6,321,323 B1* | 11/2001 | Nugroho et al. | 712/34 |
| 6,330,008 B1 | 12/2001 | Razdow et al. | |
| 6,362,825 B1 | 3/2002 | Johnson | |
| 6,412,039 B1 | 6/2002 | Chang | |
| 6,668,325 B1 | 12/2003 | Collberg et al. | |
| 6,684,389 B1 | 1/2004 | Tanaka et al. | |
| 6,732,060 B1 | 5/2004 | Lee | |
| 6,901,582 B1 | 5/2005 | Harrison | |
| 6,943,800 B2 | 9/2005 | Taylor et al. | |
| 6,965,994 B1 | 11/2005 | Brownell et al. | |
| 7,016,972 B2 | 3/2006 | Bertram et al. | |
| 7,047,519 B2 | 5/2006 | Bates et al. | |
| 7,095,416 B1 | 8/2006 | Johns et al. | |
| 7,107,484 B2 | 9/2006 | Yamazaki et al. | |
| 7,134,021 B2* | 11/2006 | Miyazaki et al. | 713/178 |
| 7,173,635 B2 | 2/2007 | Amann et al. | |
| 7,237,151 B2 | 6/2007 | Swoboda et al. | |
| 7,260,066 B2 | 8/2007 | Wang et al. | |
| 7,277,826 B2 | 10/2007 | Castelli et al. | |
| 7,383,205 B1 | 6/2008 | Peinado et al. | |
| 7,395,426 B2 | 7/2008 | Lee et al. | |
| 7,401,116 B1 | 7/2008 | Chalfin et al. | |
| 7,401,242 B2 | 7/2008 | Abernathy et al. | |
| 7,420,563 B2 | 9/2008 | Wakabayashi | |
| 7,505,953 B2 | 3/2009 | Doshi | |
| 7,555,499 B2 | 6/2009 | Shah et al. | |
| 7,765,500 B2 | 7/2010 | Hakura et al. | |
| 7,778,800 B2 | 8/2010 | Aguaviva et al. | |
| 7,891,012 B1 | 2/2011 | Kiel et al. | |
| 8,225,301 B2* | 7/2012 | Borges et al. | 717/163 |
| 8,819,989 B2* | 9/2014 | Paternoster et al. | 47/58.1 SC |
| 8,838,913 B1* | 9/2014 | Conover | 711/154 |
| 2001/0034835 A1 | 10/2001 | Smith | |
| 2001/0044928 A1 | 11/2001 | Akaike et al. | |
| 2002/0157086 A1 | 10/2002 | Lewis et al. | |
| 2002/0175839 A1 | 11/2002 | Frey | |
| 2003/0043022 A1* | 3/2003 | Burgan et al. | 340/7.21 |
| 2003/0120935 A1 | 6/2003 | Teal et al. | |
| 2003/0214660 A1 | 11/2003 | Plass et al. | |
| 2004/0085894 A1 | 5/2004 | Wang et al. | |
| 2004/0130552 A1 | 7/2004 | Duluk, Jr. et al. | |
| 2004/0158824 A1 | 8/2004 | Gennip et al. | |
| 2004/0162989 A1 | 8/2004 | Kirovski | |
| 2005/0132356 A1* | 6/2005 | Cross et al. | 717/174 |
| 2005/0198051 A1* | 9/2005 | Marr et al. | 707/100 |
| 2005/0222881 A1 | 10/2005 | Booker | |
| 2005/0243094 A1 | 11/2005 | Patel et al. | |
| 2005/0273652 A1 | 12/2005 | Okawa et al. | |
| 2005/0278684 A1 | 12/2005 | Hamilton et al. | |
| 2006/0047958 A1* | 3/2006 | Morais | 713/166 |
| 2006/0079333 A1 | 4/2006 | Morrow et al. | |
| 2006/0080625 A1 | 4/2006 | Bose et al. | |
| 2006/0109846 A1 | 5/2006 | Lioy et al. | |
| 2006/0161761 A1 | 7/2006 | Schwartz et al. | |
| 2006/0185017 A1* | 8/2006 | Challener et al. | 726/24 |
| 2007/0038837 A1* | 2/2007 | Ben-Zvi | 711/207 |
| 2007/0115292 A1 | 5/2007 | Brothers et al. | |
| 2007/0143854 A1* | 6/2007 | Wasilewski | 726/26 |
| 2007/0274284 A1 | 11/2007 | Dendukuri et al. | |
| 2008/0007563 A1 | 1/2008 | Aronson et al. | |
| 2008/0095090 A1 | 4/2008 | Lee et al. | |
| 2009/0044172 A1* | 2/2009 | Kolzenburg et al. | 717/108 |
| 2009/0161872 A1* | 6/2009 | O'Brien et al. | 380/271 |
| 2012/0054411 A1* | 3/2012 | Agesen | 711/6 |

OTHER PUBLICATIONS

A Relational Debugging Engine for the Graphics Pipeline, Duca et al., http://citeseer.ist.psu.edu/cache/papers/cs2/167/http:zSzzSzwww.cs.jhu.eduzSz~cohenzSzPublicationszSzgldb.pdf/a-relational-debugging-engine.pdf International Conference on Computer Graphics and Interactive Techniques, ACM SIGGRAPH 2005, pp. 453-463, LA, ISSN:0730-0301.

ATI Radeon X800, 3D Architecture White Paper, ATI, 2005, pp. 1-13, with proof of seniority (4 pages), according to ACM bibliograghy regarding the document: "The Direct3D 10 System", ACM TOG, vol. 25, Iss. 3 (Jul. 2006), Reference 1; eHG.

gDEBugger, graphicREMEDY, http://www.gremedy.com/, Aug. 7, 2006.

N. Tatarchuk, "New RenderMonkey Features for DirectX and OpenGL Shader Development", Game Developers Conference, Mar. 2004.

gDEBugger, graphicREMEDY, http://www.gremedy.com/, Jul. 29, 2005.

C. Cebenoyan and M. Wloka, "optimizing the graphics pipeline", 2003, Nvidia GDC Presentation Slide.

Graphic Remedy; gDEBugger screen shots; pp. 1-18.

Jeffrey K. Hollingsworth and Barton P. Miller, "Dynamic Control of Performance Monitoring on Large Scale Parallel Systems", Jul. 23, 1993, ACM, International Conference on Supercomputing: Proceedings of the 7th International Conference on Supercomputing, pp. 185-194.

Dror G. Feitelson and Larry Rudolph, "Toward Convergence in Job Scheduling for Parallel Supercomputers", Aug. 1996, Springer, Job Scheduling Strategies for Parallel Processing: IPPS '96 Workshop Hololulu, Hawaii, Apr. 16, 1996 Proceedings.

Josh Lessard, "Profiling Concurrent Programs Using Hardware Counters", May 2005, University of Waterloo, Thesis.

"GPU Performance Optimization with NVPerfHUD." NVPerfHUD 3.0. A Heads-Up Display for Performance Analysis. Nvidia Corporation. Apr. 2005, Downloaded Jan. 16, 2014: http://web.archive.org/web/20060429222414/http://download.nvidia.com/developer/tools/nvperfhud/3.1/userguide_japanese.pdf.

"NVPerfHUD," Jul. 2, 2006, Downloaded Jan. 16, 2014: http://web.archive.org/web/20060702062602/http://developer.nvidia.com/object/nvperfhud_home.html.

* cited by examiner

METHOD FOR AUTHOR VERIFICATION AND SOFTWARE AUTHORIZATION

RELATED APPLICATIONS

The present application is a divisional of U.S. patent application Ser. No. 11/366,843, filed Mar. 1, 2006, naming Jeffrey Kiel and Andrei Osnovich as inventors, assigned to the assignee of the present invention. That application is incorporated herein by reference in its entirety and for all purposes.

The present application is related to U.S. patent application Ser. No. 11/366,875, filed Mar. 1, 2006, entitled "METHOD AND COMPUTER-USABLE MEDIUM FOR DETERMINING THE AUTHORIZATION STATUS OF SOFTWARE," naming J. Kiel and A. Osnovich as inventors, assigned to the assignee of the present invention. That application is incorporated herein by reference in its entirety and for all purposes.

FIELD OF THE INVENTION

Embodiments of the present invention relate to the field of security mechanisms for hardware and software.

BACKGROUND OF THE INVENTION

During the development of certain applications, e.g., graphical applications, software developers often use performance tools provided by hardware developers to debug and optimize applications. These performance tools not only provide information about how a specific application is running on a given computer system, but also information about the hardware running the application. For example, a performance tool may enable a software developer to determine how specific commands affect the performance of a given application, while also providing information about hardware bottlenecks.

Despite the utility that performance tools provide to developers of Direct3D and OpenGL applications, the methods used to obtain information may provide an unauthorized user insight into the intellectual property of the application, hardware drivers, and/or the hardware itself. For example, hardware and software counters are commonly used to provide information on a per-frame basis. Hardware counters provide data directly from various points inside the GPU, while software counters give insight into the state and performance of the driver. As such, an unauthorized user able to intercept the counters may then reverse-engineer the graphical application, hardware drivers, and/or the hardware itself.

Despite conventional security measures implemented by hardware developers, unauthorized users employ several methods to usurp the conventional measures and gain access to the information provided by the performance tools. One commonly-used method, referred to as DLL injection, allows an unauthorized user to load unauthorized code (e.g., as an executable file or a dynamic link library) into the process space of a graphical application such that the code can receive and report the hardware and software counters as the graphical application runs.

A second method involves using a LoadLibrary function in the unauthorized application to load the graphical application. The unauthorized application would perform the appropriate actions to satisfy the security measures, and then call the LoadLibrary function to load and subsequently run the graphical application. While the graphical application is running, the unauthorized application would be able to collect the hardware and/or software counters, thereby enabling reverse engineering.

A third method, similar to the second, involves performing a raw read of the graphical application into memory as a binary data file. The unauthorized application would again satisfy the security requirements and read the target graphical application into memory. Thereafter, once the authorized application has been loaded, the unauthorized user may call into the memory space to run the application while collecting the hardware and/or software counters.

A fourth method takes advantage of the fact that the hardware and software counters are a system-wide resource, giving insight into any and all applications running on the system. Accordingly, the unauthorized application would be run, satisfy the security requirements, and begin collecting the hardware and/or software counters without performing any graphical operations. Thereafter, the unauthorized user may simultaneously run the graphical application to collect the hardware and/or software counters and gain insight into the hardware and/or the graphical application.

SUMMARY OF THE INVENTION

Accordingly, a need exists for a solution to reduce unauthorized access to performance data output via graphical performance tools, thereby minimizing the ability to reverse engineer and discover intellectual property of software and hardware developers. More specifically, a need exists to authorize applications prior to execution, and also to verify that the user requesting authorization is the authorized author of the application. Additionally, a need exists to verify the authenticity of an application requesting performance data upon execution of the application. Furthermore, a need exists to monitor the access of applications to the performance data. Embodiments of the present invention provide novel solutions to these needs and others as described below.

Embodiments of the present invention are directed to a computer-implemented method for author verification and authorization of object code. More specifically, embodiments provide an effective and efficient mechanism to digitally sign an application created by an authorized author such that the digital signature can then be verified upon execution of the application and the number of applications requesting performance data can be monitored. As such, embodiments improve security for both software and hardware by reducing unauthorized access to performance data output via graphical performance tools. In one embodiment, program object code is linked with a plurality of data blocks to create linked object code and a MAP file. Thereafter, author verification is performed by executing a plurality of comparisons between the linked object code and the MAP file. In another embodiment, program object code is linked with a plurality of function object codes to create linked object code. A digital signing procedure is then performed on the linked object code by creating a signature data block consisting of a checksum of the code pages of the linked object code, a copy of the PE header from the linked object code and a computer-system identifier. The signature data block is then encrypted and written to the linked object code to create digitally-signed object code. In another embodiment, an application program embodied in linked object code generates a data packet consisting of a checksum of the code pages of the linked object code, a copy of the PE header from the linked object code and a computer-system identifier. The data packet is then compared to a previously-generated signature data packet from the linked object code to determine if the linked object code is authorized.

More specifically, one embodiment of the present invention pertains to a computer-implemented method for author verification of object code. The method includes: linking program object code with a plurality of data blocks, wherein the linking creates linked object code and an associated map file; and executing an authorization of the linked object code upon execution of the linked object code, wherein the authorization comprises performing a plurality of comparisons of the linked object code with the associated map file.

Another embodiment of the present invention pertains to a computer-implemented method for authorizing object code. The method includes: linking program object code with a plurality of function object codes, wherein the linking produces linked object code; performing a digital signing procedure of the linked object code including: creating a first signature data block comprising information about the linked object code and a computer-system identifier of a computer system authorized to operate the linked object code; encrypting the first signature data block; and writing the first encrypted signature data block to the linked object code to create a digitally-signed object code.

Another embodiment of the present invention pertains to a computer-implemented method for authorizing object code. The method includes: executing an application program embodied in an executable file; during the executing, the application program: determining if a code page in a memory is accessed; loading a first data packet; generating a second data packet; and sending the first and second data packets to a driver; and upon receiving the first and second data packets, the driver comparing the first data packet to the second data packet to determine if the executable file is authorized.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
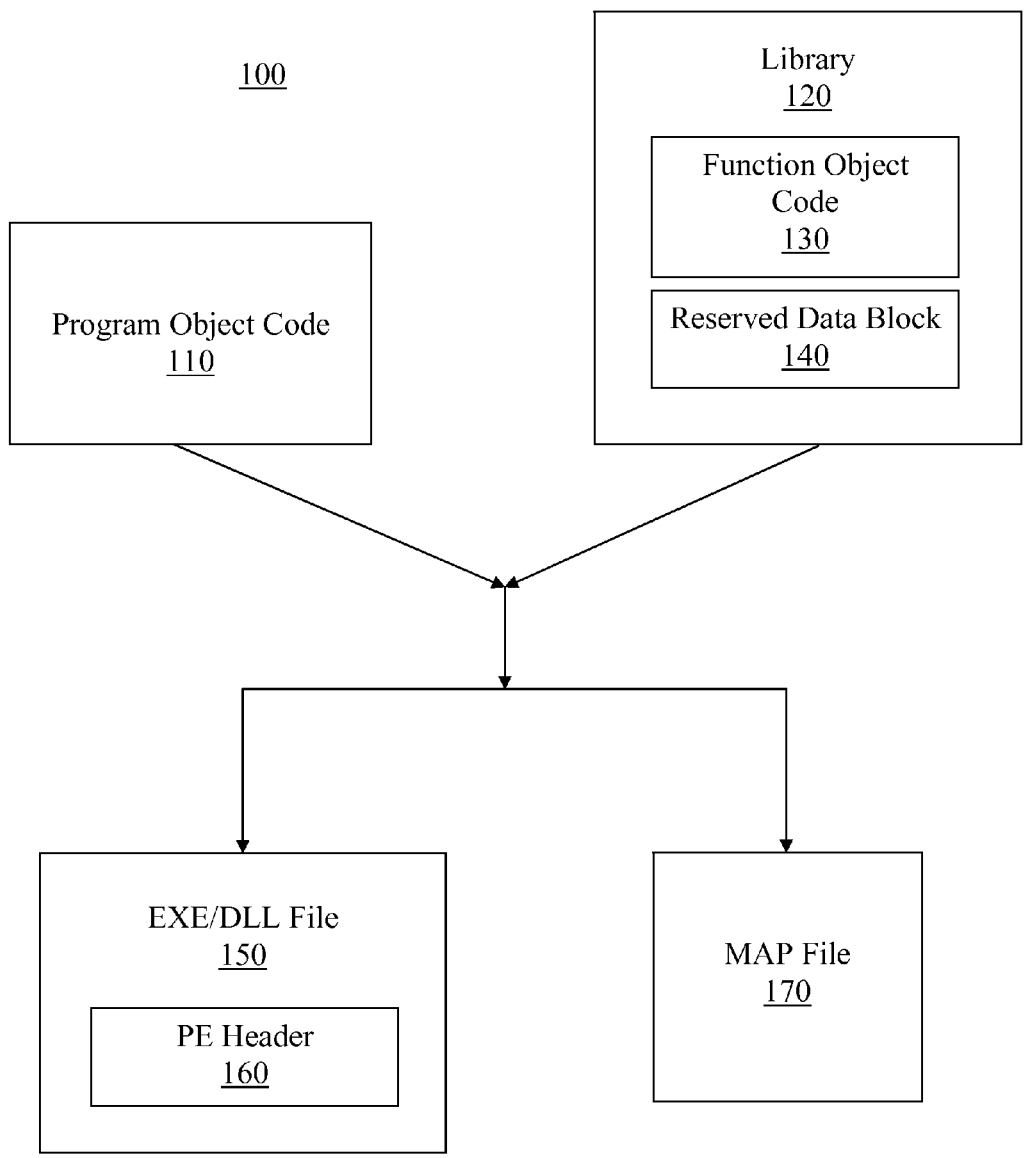
FIG. 1 shows a block diagram depicting the linking of program object code with a library to produce an executable file or dynamic link library and a MAP file in accordance with one embodiment of the present invention.

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "defining," "determining," "performing," "processing," "comparing," "repeating," "creating," "generating," "establishing," "using," "calculating," "adding," "linking," "encrypting," "writing," "reading," "sending," "updating," "incrementing," "decrementing," "resetting," "revoking," "assembling," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of The Invention

FIG. 1 shows block diagram 100 depicting the linking of program object code 110 with library 120 to produce an executable file or dynamic link library 150 and MAP file 170 in accordance with one embodiment of the present invention. In one embodiment, program object code 110 may be a graphical application undergoing debugging and analysis by a software developer prior to public release. In another embodiment, function object code 130 included within library 120 may be one of several applications provided by a hardware developer to authorize executable file or dynamic link library (EXE) 150, enabling a trusted (e.g., "authorized") software developer of program object code 110 to receive performance data via performance tools published by the hardware developer without subjecting the intellectual property of either the hardware or software developer to access by unauthorized users. In another embodiment, function object code 130 may be one of several applications provided by a hardware developer to maintain the authorized status of EXE 150 such that performance data may continue to be output during execution of EXE 150.

As shown in FIG. 1, library 120 comprises function object code 130 and reserved data block 140. In one embodiment, the resulting EXE 150 includes portable executable (PE) header 160, as well as other object code (e.g., program object code 110, function object code 130, reserved data block 140). As such, embodiments allow linked object code (e.g., function object code 130) to run prior to, during, or subsequent to the execution of EXE 150. Although reference will be made throughout this detailed description to linked object code as executable files, EXE, or the like, it should be understood that such reference should also include dynamic link libraries (DLL) as a DLL is similar in structure and function to an executable file.

As depicted in FIG. 1, library 120 includes function object code 130 and reserved data block 140. However, in other embodiments, library 120 may include a plurality of function object codes and/or a plurality of reserved data blocks. As such, library 120 provides a convenient and flexible means for a hardware developer to package programs (e.g., to implement security features) to be included in the executable file. Such programs may then enable the trusted software developer to utilize performance tools of the hardware developer to debug and improve the efficiency of graphical applications, while reducing access to such tools by unauthorized users.

Figure 2:
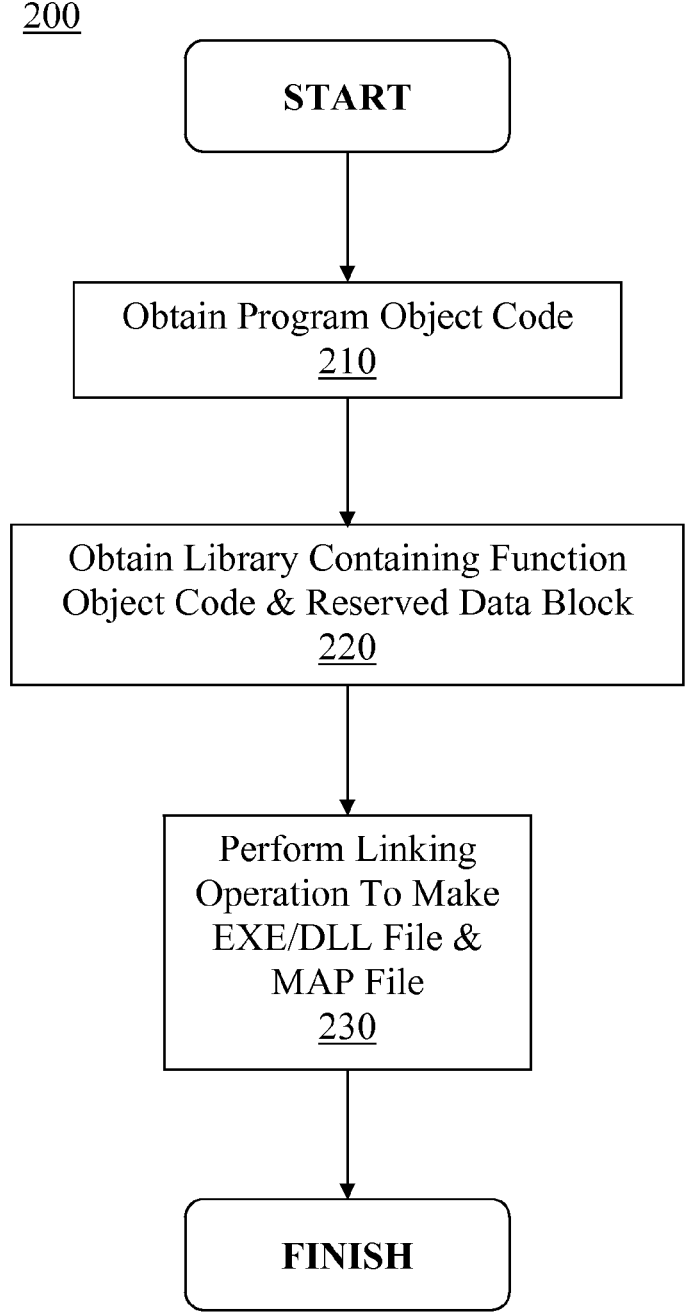
FIG. 2 shows a computer-implemented process for linking program object code with a library to produce an executable file or dynamic link library in accordance with one embodiment of the present invention.

FIG. 2 shows computer-implemented process 200 for linking program object code with a library to produce an executable file or dynamic link library in accordance with one embodiment of the present invention. As the steps of process 200 are described herein, reference will be made to block diagram 100 of FIG. 1 to provide examples and help clarify the discussion.

As shown in FIG. 2, step 210 involves obtaining program object code (e.g., program object code 110) to be linked. In one embodiment, program object code may be a graphical application (e.g., compliant with the OpenGL or Direct3D APIs) of a software developer wishing to use the performance tools of a hardware developer. In step 220, a library (e.g., library 120) is obtained to be linked with the program object code obtained in step 210. In one embodiment, the library obtained in step 220 may contain function object codes designed to authorize the application such that the software developer may receive performance data via the performance tools of the hardware developer.

After obtaining the program object code and the library, the files are then linked to produce an executable file (e.g., EXE 150) and a MAP file (e.g. MAP file 170) in step 230. In one embodiment, the MAP file may be a text file containing relevant information about the associated executable file (e.g., data and time of linking, addresses of functions and data within the associated executable file, etc.). And in other embodiments, the executable file may contain a PE header (e.g., PE header 160) containing information about the executable file similar to that contained within the MAP file. It is appreciated that the PE header and MAP file are well-known and produced when the executable file is produced.

Figure 3:
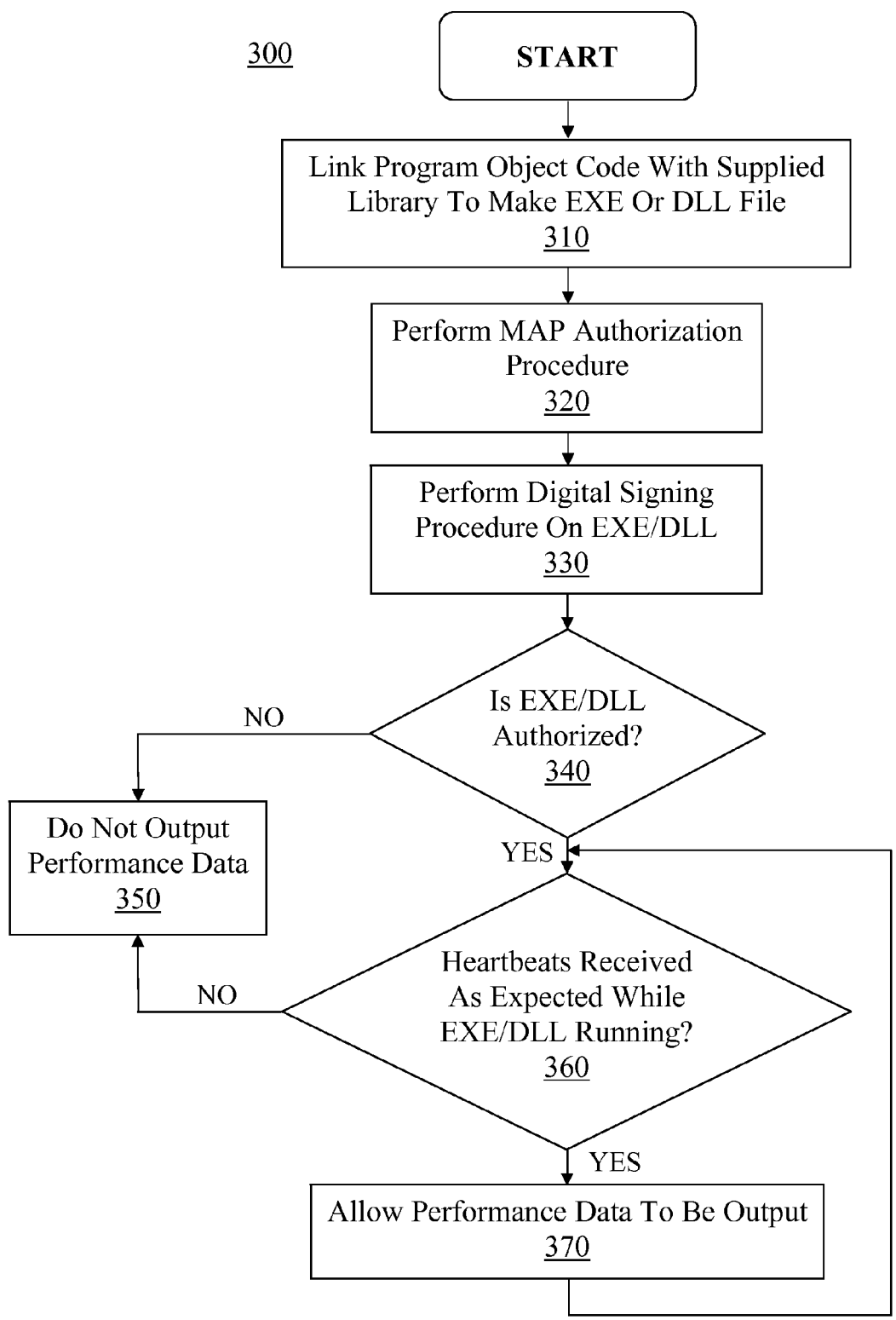
FIG. 3 shows a computer-implemented process for author verification and object code authorization in accordance with one embodiment of the present invention.

FIG. 3 shows computer-implemented process 300 for author verification and object code authorization in accordance with one embodiment of the present invention. As shown in FIG. 3, step 310 involves linking supplied object code with a supplied library as discussed above with respect to FIGS. 1 and 2.

After the files are linked to produce an executable file and a MAP file, a MAP file authorization process (e.g., process 500 of FIG. 5) is performed in step 320. In one embodiment, a series of comparisons are performed to verify that the user seeking digital signature of the executable file (e.g., by process 700 of FIG. 7) is the trusted developer who linked the code. As such, embodiments reduce the likelihood that an unauthorized user can modify or create a MAP file after the linking has been performed, thereby improving the security of the data released via the performance tools of a hardware developer. Accordingly, if the MAP file is found to be unauthorized, then executable file may not be digitally signed in step 330.

If the MAP file is found to be authorized in step 320, then the executable file may be digitally signed in step 330 of process 300. In one embodiment, step 330 involves deriving a digital signature (e.g., by compiling data from the executable file into a data packet) that can be written into the executable file. The digital signature may then be compared to a second data packet derived at a later time (e.g., upon executing the executable file) to ensure that the user executing the executable file is authorized. As such, access to performance data by unauthorized users is reduced. In other embodiments, a computer-system identifier is included in the digital signature. As such, security is further improved by limiting the release of performance data to a user of a computer system on which the executable file was digitally signed.

After the executable has been digitally signed, a determination is made in step 340 as to whether the executable file is authorized. In one embodiment, an authorization function (e.g., function object code 130) may perform the authorization upon execution of the executable file. The initialization may run a series of checks (e.g., involving the digital signature and other portions of the file) to ensure that the file has not been altered since the time it was digitally signed and that it is being executed by an authorized user. In other embodiments, further checks are performed to ensure that the in-memory image is consistent with that of authorized use of the executable file. Accordingly, if any of the checks are failed, the executable file is not deemed authorized and performance data is not output in step 350.

However, if the executable file is found to be authorized, then a determination is made in step 360 as to whether the authorized status of the executable file should be revoked. In one embodiment, a function code within the executable file (e.g., 130) directs a small (a "light heartbeat") data packet to be periodically sent (e.g., once per frame) to a driver to maintain the authorized status of the executable file. As such, if a light heartbeat data packet is not received within an expected time, the authorized status of the executable file may be revoked. In another embodiment, a function code within the executable file (e.g., 130) directs a large (a "heavy heartbeat") data packet to be generated and sent to a driver to maintain the authorized status of the executable file. Upon receipt of a heavy heartbeat data packet, a determination may be made as to whether the heavy heartbeat data packet matches a previously-obtained digital signature. As such, if a portion of the heavy heartbeat data packet does not match the previously-obtained digital signature, then the authorized status of the executable file may be revoked. Accordingly, if the authorized status of the executable file is not revoked in step 360, then performance data may be output in step 370. Thereafter, step 360 may be repeated to maintain the authorized status of an executable file.

Figure 4:
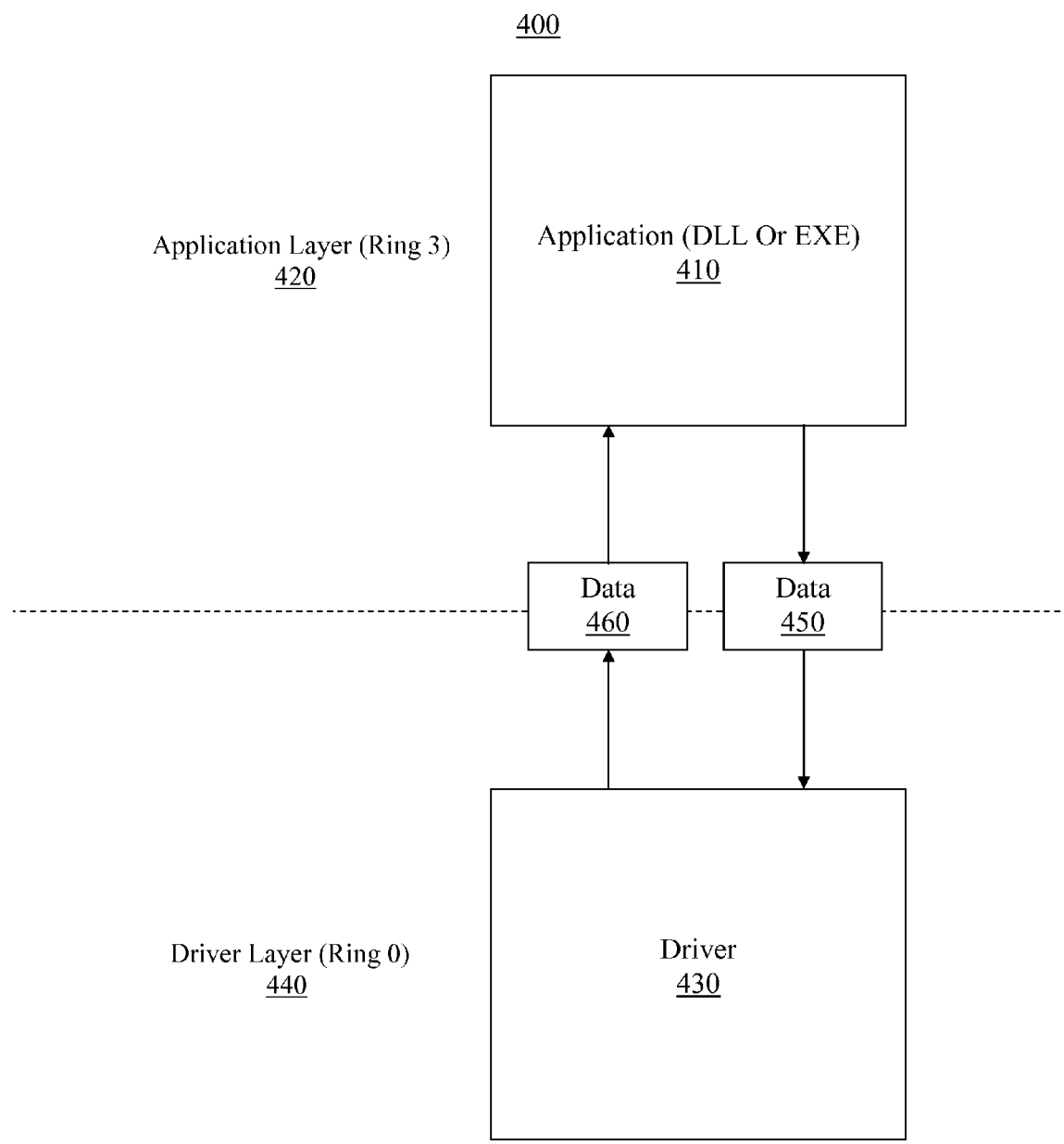
FIG. 4 shows a block diagram depicting the transfer of data between application and driver layers in accordance with one embodiment of the present invention.

FIG. 4 shows block diagram 400 depicting the transfer of data between application and driver layers in accordance with one embodiment of the present invention. As shown in FIG. 4, application 410 is executing in application layer 420 (e.g., in ring three or user space, which is unprotected), while driver 430 is executing in driver layer 440 (e.g., in ring zero or kernel space, which is protected). As such, application 410 communicates with driver 430 by transferring data between layers. For example, data 450 transferred from application 410 to driver 430 moves from application layer 420 to driver layer 440. Similarly, data 460 transferred from driver 430 to application 410 moves from driver layer 440 to application layer 420. Additionally, although only two layers are depicted in FIG. 4, it should be understood that one or more additional layers may reside between application layer 420 and driver layer 440.

The communication architecture depicted in FIG. 4 may be used to improve security as driver layer 440 offers more security than application layer 420, making monitoring of security measures more difficult. In one embodiment, the MAP authorization process of step 320 may be executed at the driver layer to reduce access to unauthorized users. In another embodiment, while the function code performing the authorization procedure of step 340 may execute at the application layer, any checks performed may be executed at the driver layer for improved security.

MAP Authorization Procedure

Figure 5:
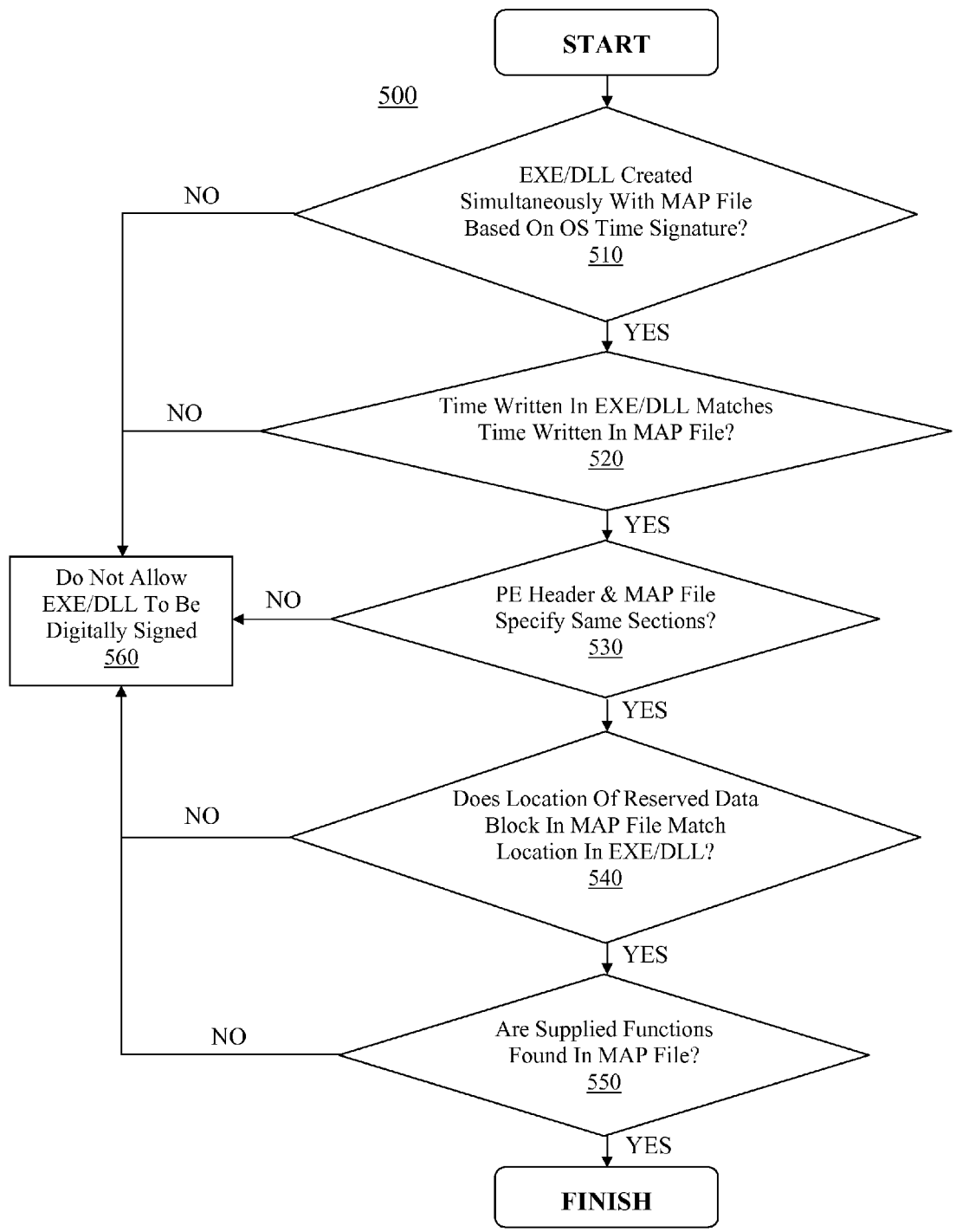
FIG. 5 shows a computer-implemented MAP file authorization process in accordance with one embodiment of the present invention.

FIG. 5 shows computer-implemented MAP file authorization process 500 in accordance with one embodiment of the present invention. Embodiments allow verification that the user seeking to digitally sign the executable file is the author of the executable file. As such, embodiments of the present invention increase the difficulty by which an unauthorized user may digitally sign an executable file, and thus, gain access to performance data outputted via performance tools. Additionally, in one embodiment, the object code used to implement process 500 may be hand obfuscated and/or encrypted to make debugging and disassembly more difficult, thereby increasing the security of the performance data.

As shown in FIG. 5, step 510 involves comparing the operating system time signature on both the MAP file (e.g., 170) and the executable file (e.g., 150) to ensure that both were created at the same time. In one embodiment, the date and time must result in an exact match. In other embodiments, a match will be found if the date and time are within a predetermined tolerance. Accordingly, if a match is not found, then the executable file will not be allowed to be digitally signed in step 560. However, if a match is found, then step 520 will be performed.

As shown in FIG. 5, step 520 involves comparing a time signature within the MAP file (e.g., 170) and the executable file (e.g., 150) to ensure that both were created at the same time. In one embodiment, the date and time must result in an exact match. In other embodiments, a match will be found if the date and time are within a predetermined tolerance. Accordingly, if a match is not found, then the executable file will not be allowed to be digitally signed in step 560. However, if a match is found, then step 530 will be performed.

As shown in FIG. 5, step 530 involves comparing the MAP file (e.g., 170) to the PE header of the executable file (e.g., 160) to ensure that both specify the same data and code sections. Accordingly, in one embodiment, if the MAP file and the PE header do not specify the same sections, then the executable file will not be allowed to be digitally signed in step 560. However, if the files do specify the same sections, then step 540 will be performed.

As shown in FIG. 5, step 540 involves comparing the location of the reserved data block (e.g., 140) within the MAP file (e.g., 170) and the executable file (e.g., 150) to determine if the locations match. In one embodiment, if a match is not found, then the executable file will not be allowed to be digitally signed in step 560. However, if a match is found, then step 550 will be performed.

As shown in FIG. 5, step 550 involves a determination as to whether the function object codes (e.g., 130) provided in the library (e.g., 120) prior to linking are found within the MAP file (e.g., 170). In one embodiment, if any of the function object codes linked into the executable file are not listed in the MAP file, then the executable file will not be allowed to be digitally signed in step 560. However, if all function object codes are listed, then the MAP file will be considered authorized. As such, in one embodiment, the executable file corresponding to the authorized MAP file may then be digitally signed, as shown in FIG. 6.

Digital Signing Procedure

Figure 6:
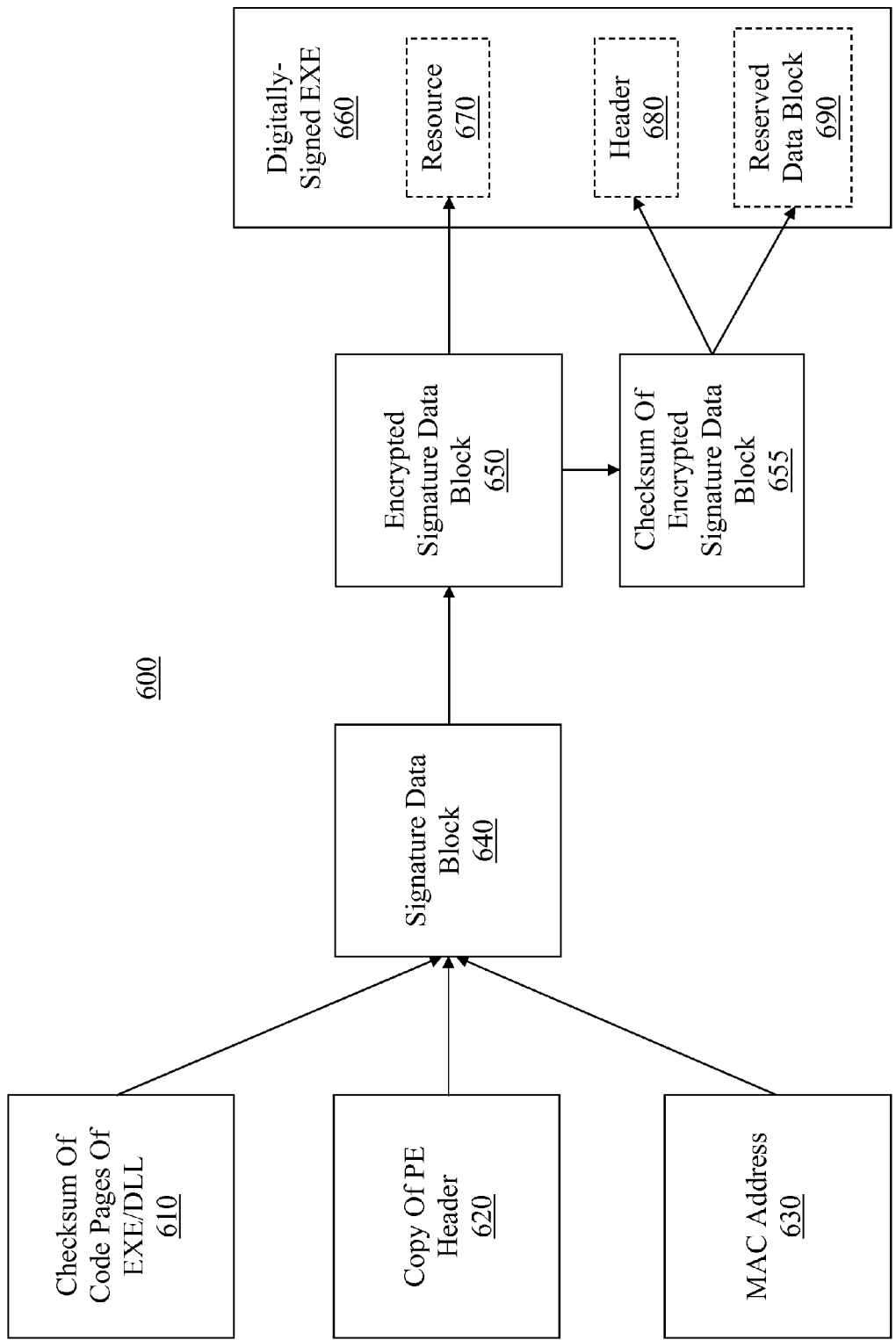
FIG. 6 shows a block diagram depicting the generation of a digitally-signed executable file in accordance with one embodiment of the present invention.

FIG. 6 shows block diagram 600 depicting the generation of digitally-signed executable file 660 in accordance with one embodiment of the present invention. As shown in FIG. 6, checksum of the code pages in memory 610 is determined to provide a unique representation of the in-memory image via a cyclic redundancy check (CRC), hash function, or the like. As such, any subsequent alteration of the code pages in memory may be detected by re-computing the checksum and comparing that value to checksum 610.

After checksum 610 is determined, a copy of the PE header of the executable file 620 and MAC address 630 (e.g., of the system performing the digital signing) are combined with checksum 610 to create signature data block 640. Signature data block 640 is then encrypted (e.g., using the MAC address of the system performing the digital signing as the encryption key) to produce encrypted signature data block 650. Checksum of encrypted signature data block 655 is determined via a CRC, hash function, or the like. Thereafter, digitally-signed EXE 660 is generated by writing encrypted signature data block 650 to the executable file (e.g., 150) as resource 670 and writing checksum of encrypted signature data block 655 to both header 680 (e.g., a portion other than the PE header) and reserved data block 690 (e.g., 140). In one embodiment, resource 670 may be an icon, image, block of data, or the like. In another embodiment, encrypted signature data block may be written to another location in the executable file, in addition to or in place of resource 670, so long as the digital signature is not altered by doing so. And in another embodiment, checksum 655 may be written to another location in the executable file, in addition to or in place of header 680 and/or reserved data block 690, so long as the digital signature is not altered by doing so.

Although FIG. 6 depicts three specific pieces of data being combined to form signature data block 640 (e.g., checksum 610, copy of PE header 620 and MAC address 630), it should be understood that greater or fewer pieces of data relating to the executable file and/or the computer system performing the digital signing may be included in signature data block 640. Accordingly, in one embodiment, security may be increased by increasing the number of elements, or alternatively decreased by decreasing the number of elements. Additionally, it should be understood that the security may be similarly varied by writing checksum 655 to a greater or fewer number of locations within digitally-signed EXE 660.

Figure 7A:
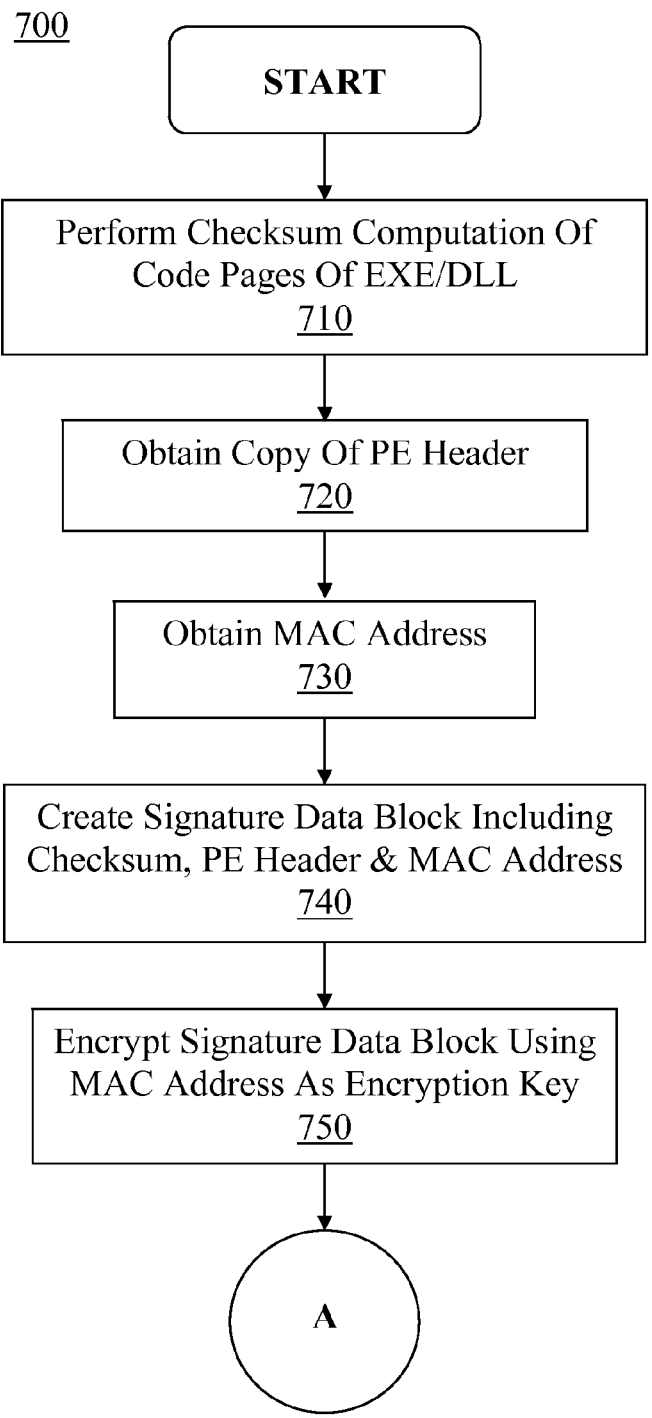
FIG. 7A shows a first portion of a computer-implemented digital signing process for creating an encrypted signature data block in accordance with one embodiment of the present invention.
Figure 7B:
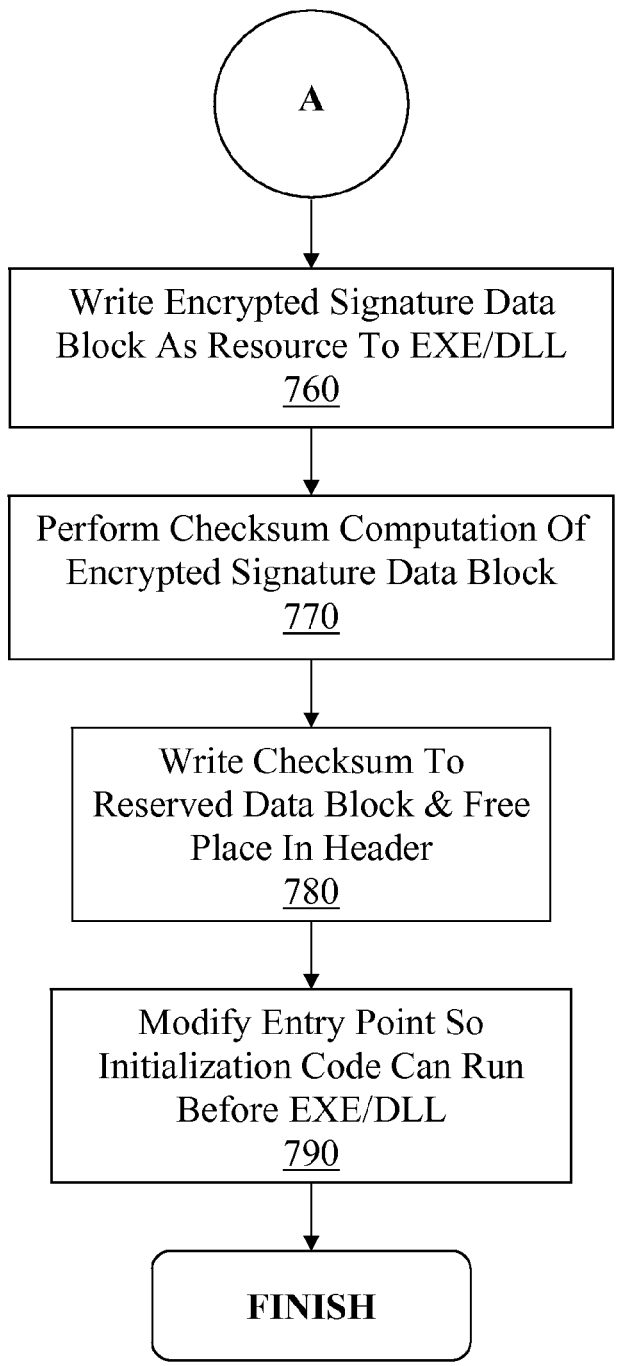
FIG. 7B shows a second portion of a computer-implemented digital signing process in accordance with one embodiment of the present invention.

FIGS. 7A and 7B show computer-implemented process 700 for digitally signing an application in accordance with one embodiment of the present invention. In one embodiment, the object code used to implement process 700 may be hand obfuscated and/or encrypted to make debugging and disassembly more difficult, thereby increasing the security of the performance data. As the steps of process 700 are described herein, reference will be made to FIGS. 1 and 6 to provide examples and help clarify the discussion.

As shown in FIG. 7A, step 710 involves performing a checksum computation of the code pages in memory. As discussed above with respect to FIG. 6, a checksum (e.g., 610) provides a mechanism to detect subsequent changes in the in-memory image, and may be calculated by any conventional method (e.g., CRC, hash function, etc.). In one embodiment, the checksum is disproportionately smaller (e.g., 32 bytes) than the in-memory image on which the computation is being performed. As such, a checksum may be utilized in a digital signature given its utility in detecting subsequent changes and its small size.

After the checksum is calculated, a copy of the PE header of the executable file is obtained in step 720. The PE header (e.g., 160) is also very useful in a digital signature, as it provides a snapshot of the executable file (e.g., 150) at the time of signing. As such, in one embodiment, subsequent changes to either the executable file or the sections of the executable file referenced in the PE header can be detected.

As shown in FIG. 7A, step 730 involves obtaining the MAC address of the computer system performing the digital signing process 700. In one embodiment, the MAC address is used as a unique identifier to ensure that the computer system requesting performance data during subsequent execution of the executable file is the same as that which performed the digital signing. As such, the security of the performance data is increased as it is unlikely that an unauthorized can later gain access to the computer system which performed the digital signing. Accordingly, it should be understood that in other embodiments, other computer-system identifiers may be used.

After the checksum, copy of the PE header and MAC address are obtained, the data is combined to form a signature data block in step 740. Although FIG. 7A depicts one embodiment where only three pieces of data are combined to form the signature data block (e.g., 640), it should be understood that in other embodiments a greater or fewer number of data blocks may be combined. As discussed above, embodiments provide the ability to vary the number of data blocks comprising the signature data block, thereby enabling convenient and efficient regulation of the security level of the performance data.

As shown in FIG. 7A, the signature data block is then encrypted in step 750. In one embodiment, the encrypted signature data block (e.g., 650) is encrypted using the MAC address of the computer system performing process 700 as the encryption key. However, in other embodiments, other features of either the executable file (e.g., a checksum of the PE header, checksum 610 of the code pages in memory, data written into a reserved data block prior to digital signing, etc.) or the computer system may be used as the encryption key to further regulate the security level.

Now referring to FIG. 7B, the encrypted signature data block is written to the executable file in step 760. In one embodiment, the encrypted signature data block (e.g., 650) is written as a resource (e.g., 670) such that it may later be called by either the executable file or a driver. In other embodiments, the encrypted signature data block may be written to another free place in the executable file, so long as the location will not alter the digital signature itself.

Once the encrypted signature data block is written to the executable file, a checksum calculation is performed on the encrypted signature data block in step 770 (e.g., creating checksum 655). In one embodiment, the checksum may be calculated by a CRC. And in other embodiments, the checksum may be calculated using other conventional functions (e.g., hash functions or the like).

As shown in FIG. 7B, the checksum is then written to the executable file in step 780 to complete the digitally-signed executable file (e.g., 660). In one embodiment, the checksum derived in step 770 (e.g., 655) may be written to both the data block reserved during linking (e.g., 690) and a free place in the header (e.g., 680). In one embodiment, the checksum is written to any place within the header outside of the PE header (e.g., 160), as to avoid altering the digital signature. And in other embodiments, the checksum may be written to a greater or fewer number of places within the executable file, so long as the portions used in the digital signature are not altered in such a way as to alter the digital signature.

After writing the checksum of the encrypted signature data block to the executable file, the entry point of one or more of the function object codes linked into the executable file are modified in step 790. In one embodiment, the entry point of a function object code (e.g., 130) may be modified such that it runs before a portion of the executable file upon execution of the executable file (e.g., 660). In other embodiments, the entry points of one or more function codes may be altered such that they may run before or after certain portions of the executable file. As such, embodiments provide a convenient mechanism to adjust when and how function object codes run for security or other purposes upon execution of the executable file.

EXE Authorization Function

Figure 8A:
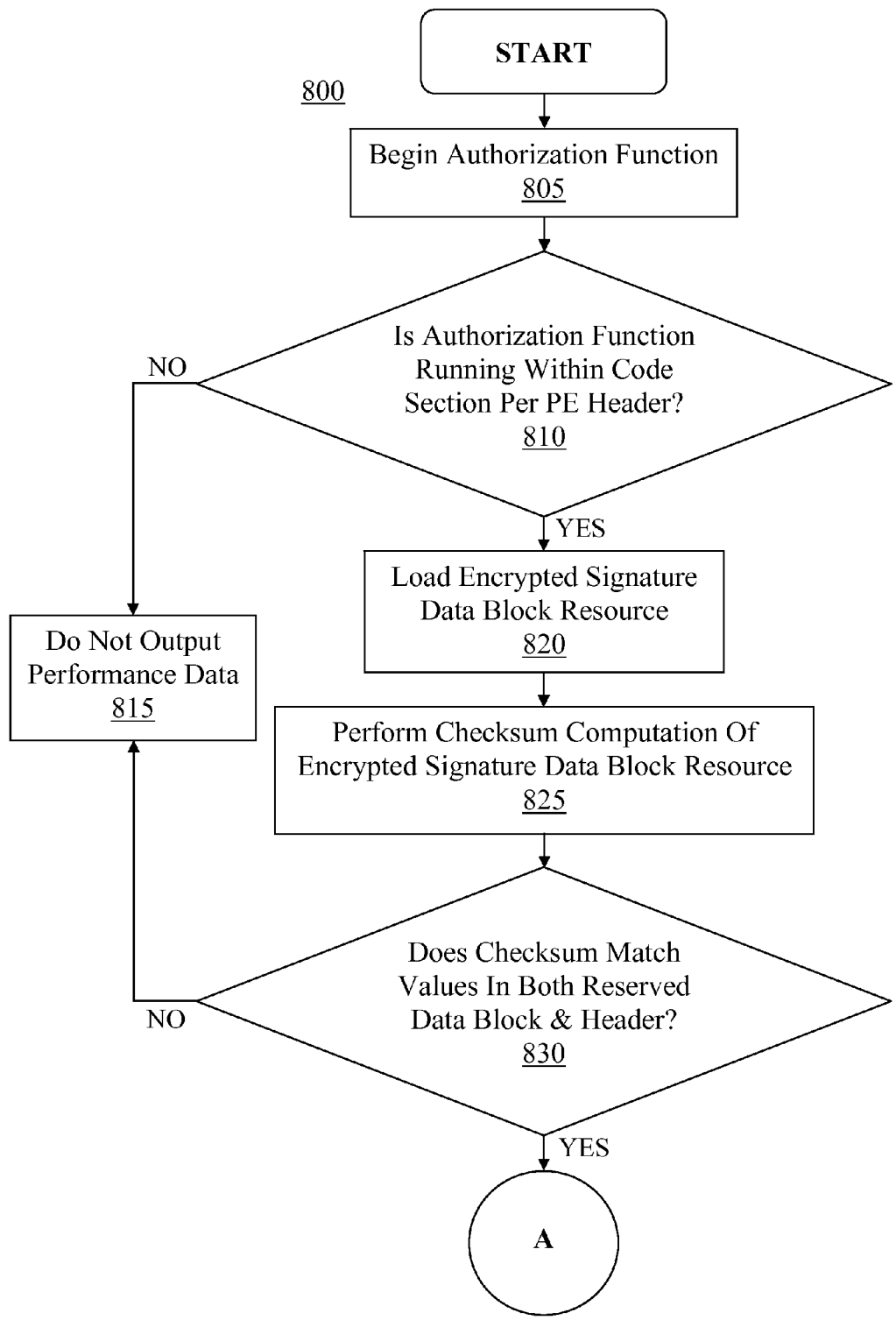
FIG. 8A shows a first portion of a computer-implemented authorization process for object code in accordance with one embodiment of the present invention.
Figure 8B:
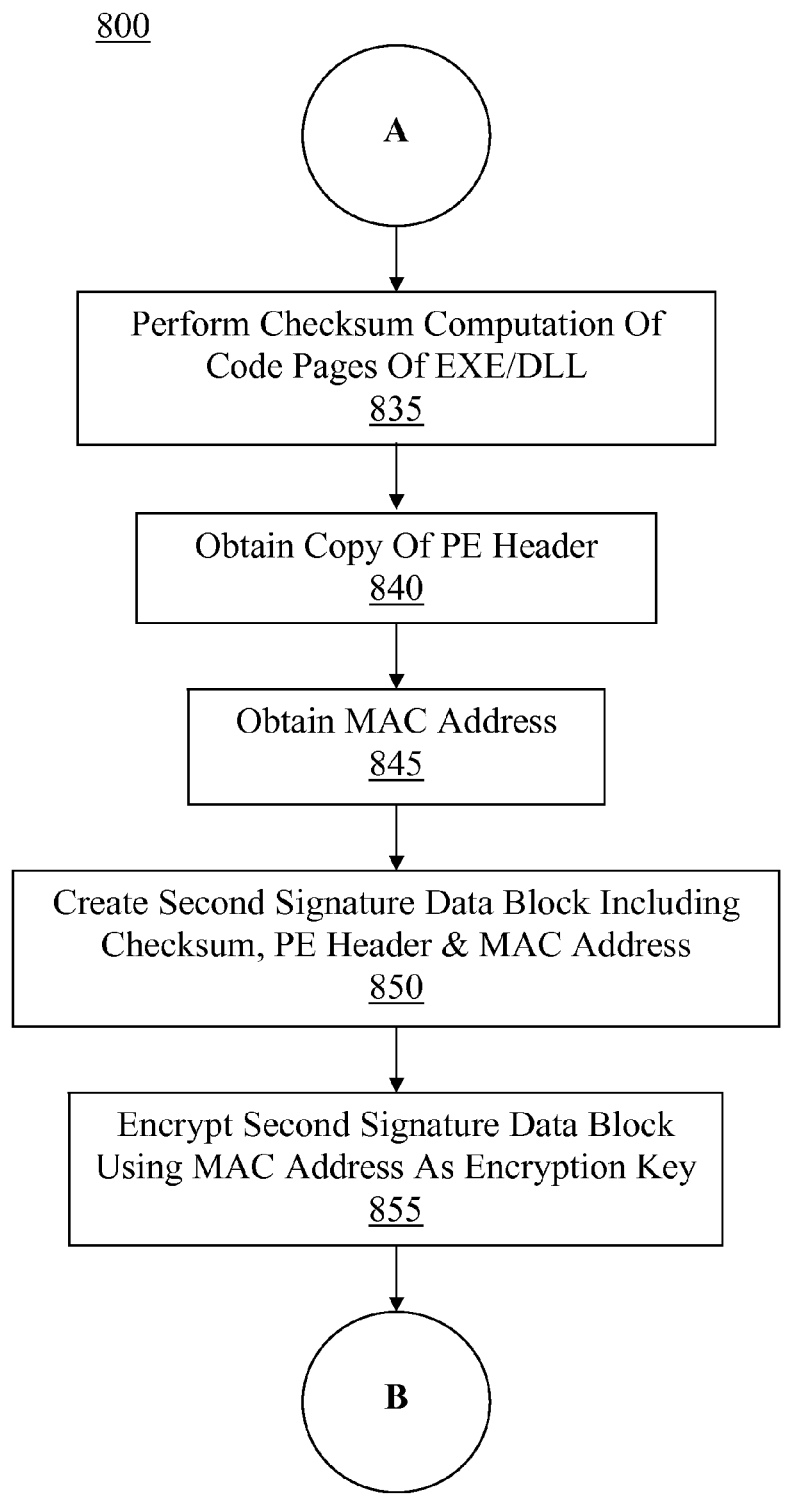
FIG. 8B shows a second portion of a computer-implemented authorization process for object code in accordance with one embodiment of the present invention.
Figure 8C:
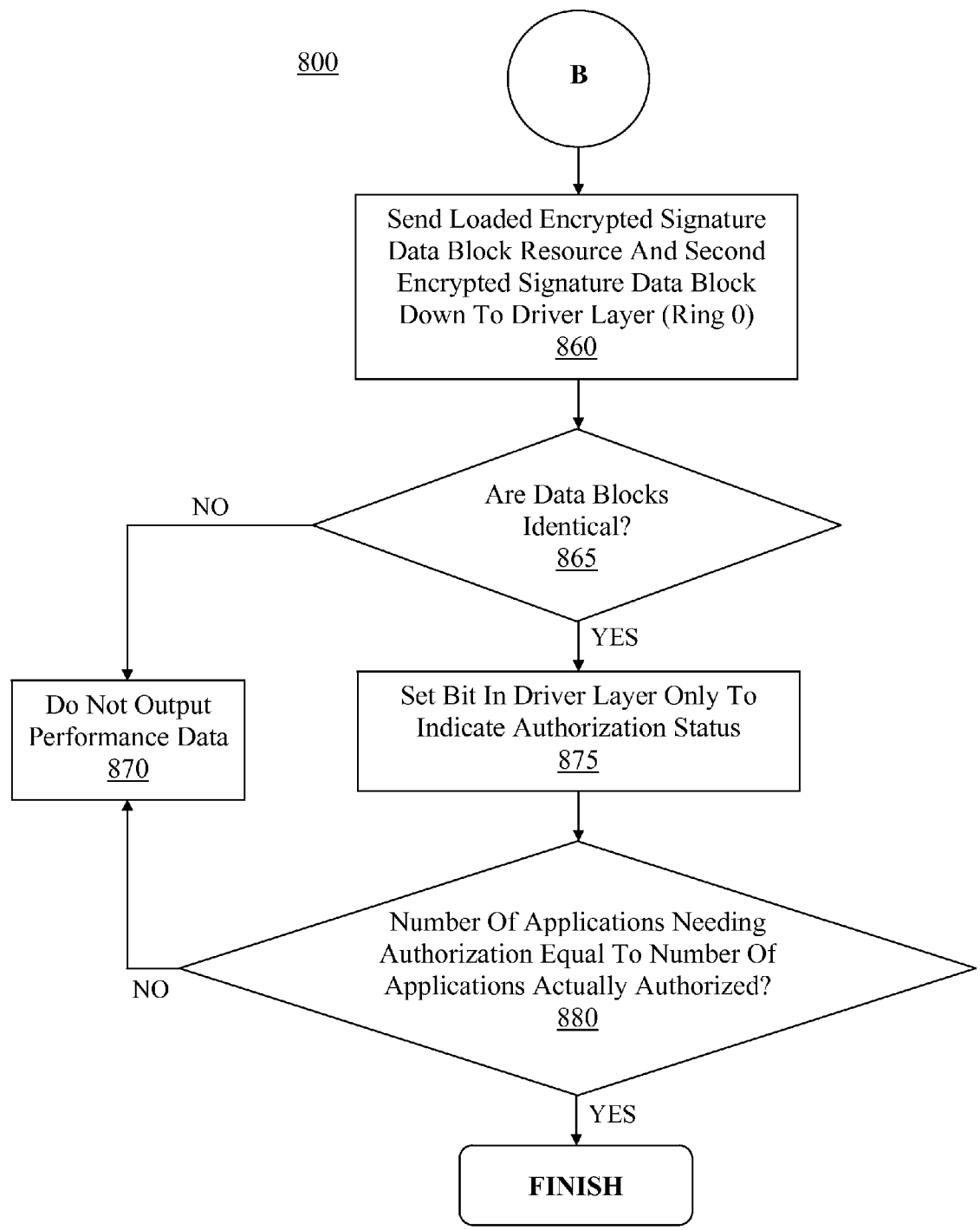
FIG. 8C shows a third portion of a computer-implemented authorization process for object code in accordance with one embodiment of the present invention.

After an executable file is digitally signed, embodiments provide a mechanism to authorize the executable such that it may be subsequently executed in a more secure manner. FIGS. 8A, 8B and 8C show computer-implemented process 800 for authorizing object code in accordance with one embodiment of the present invention. As the steps of process 800 are described herein, reference will be made to FIGS. 1, 4, 6, 7A and 7B to provide examples and help clarify the discussion.

As shown in FIG. 8A, step 805 involves the calling of a function to perform the authorization of the executable file. In one embodiment, the function performing the authorization may be one of the function object codes (e.g., 130) linked into the executable file (e.g., 150). As such, once executable file is executed, the entry point for the function object code (e.g., that determined in step 790 of FIG. 7B) determines when the executable file will call the function to begin authorization.

Once initiated, a determination will be made as to whether the current location in which the authorization function is running is within the code pages of the executable file in step 810. In one embodiment, the PE header (e.g., 160) will be used to determine the address range of the code pages. In one embodiment, if the current location in which the authorization function is running falls outside of the range of the code pages, then performance data will not be output in step 815.

As shown in FIG. 8A, if the current location in which the authorization function is running falls within the range of the code pages, then the encrypted signature data block (e.g., that written in step 760) will be loaded in step 820. Once loaded, a checksum computation is performed on the encrypted signature data block in step 825. In one embodiment, the same method of checksum computation used in step 770 may be used. In other embodiments, other methods of checksum computations may be utilized so long as a correlation function is used to enable a match between encrypted data blocks to be determined in step 830.

Once a checksum is calculated, a determination is made as to whether the checksum calculated in step 830 is equivalent to that written in the executable file (e.g., as in step 780). In one embodiment, if the checksum calculated in step 825 does not match that written in each portion of the executable file (e.g., both in the reserved data block and the header), then performance data will not be output in step 815. However, in another embodiment, if the checksum calculated in step 825 does match that written in each portion of the executable file, then step 835 is performed.

As shown in FIG. 8B, steps 835 through 855 are analogous to those performed in steps 710 through 750 of FIG. 7A to generate an encrypted signature data block (e.g., 650).

Upon the creation of a second encrypted signature data block in step 855, the first and second encrypted signature data blocks are sent down to a driver layer in step 860 as depicted in FIG. 8C. In one embodiment, the authorization function may operate at an application layer (e.g., 420). As such, the authorization function may send both encrypted signature data blocks down to a driver layer (e.g., 440) for comparison. As discussed above with respect to FIG. 4, the utilization of driver layers for checking and comparison purposes can increase security, as it increases the difficulty for unauthorized users to debug, disassemble, or otherwise gain access to the data in the driver layer.

As shown in FIG. 8C, upon receipt of the encrypted signature data blocks, a determination is made as to whether the data blocks are identical in step 865. As such, in one embodiment, the digital signature obtained during process 700 is compared to that obtained during execution of the executable file in process 800. In one embodiment, if the data blocks are not found to be identical in step 865, then performance data is not output in step 870.

However, if the data blocks are found to be identical in step 865, then an indication is made as to whether the executable file is authorized or not in step 875. In one embodiment, a bit is set in the driver layer to indicate the authorization status of the executable file. In another embodiment, the bit status is not reported from the driver layer. As such, embodiments increase the difficulty for unauthorized users to determine the authorization status and/or manually change the authorized state of the executable file as no information is reported from the driver layer.

As shown in FIG. 8C, a determination is made in step 880 as to whether the number of applications needing authorization is equal to the number of applications actually authorized. In one embodiment, an application needing authorization can be any application calling the authorization function of process 800. In another embodiment, an application needing authorization can be any application making any three-dimensional graphical calls (e.g., drawing, rendering, shading, creating rendering resources such as textures, etc.). And in another embodiment, the number of applications actually authorized and/or needing authorization may not exceed one. As such, in one embodiment, if the number of applications needing to be authorized is not equal to the number of applications actually authorized, then performance data is not outputted in step 870. However, in another embodiment in which number of applications needing to be authorized is equal to the number of applications actually authorized, then performance data may be output.

Heartbeat Function

Once an executable file is digitally signed and authorized, embodiments of the present invention provide a mechanism to periodically determine the authorization status of the executable file during execution. As such, embodiments can detect unauthorized access and take measures to counteract it through the revocation of the authorized status of the executable file.

Figure 9:
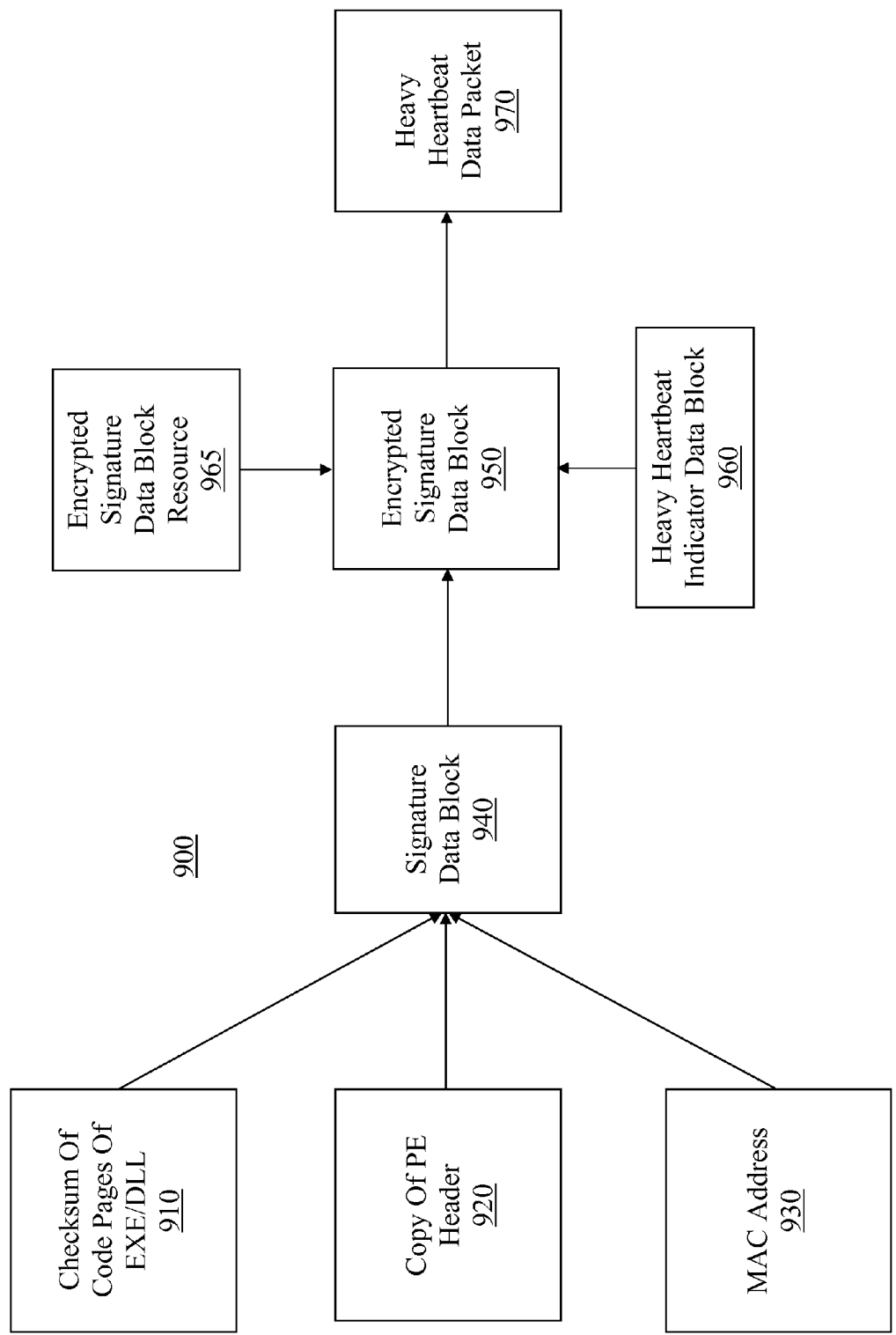
FIG. 9 shows a block diagram depicting the generation of a heavy heartbeat data packet in accordance with one embodiment of the present invention.

FIG. 9 shows block diagram 900 depicting the generation of a heavy heartbeat data packet in accordance with one embodiment of the present invention. In one embodiment, a heavy heartbeat data packet is sent from the application layer to the driver layer periodically to maintain the authorization status of the executable file. As such, before it is sent, the heavy heartbeat data packet is generated by first combining the checksum of the code pages in memory 910, a copy of the PE header of the executable file 920 and MAC address 930 (e.g., of the system executing the executable file) to form signature data block 940. As discussed above with respect to FIG. 6, the checksum of the code pages is determined to provide a unique representation of the in-memory image via a CRC, hash function, or the like. As such, any subsequent alteration of the code pages in memory may be detected by re-computing the checksum and comparing that value to checksum 910.

As shown in FIG. 9, signature data block 940 is encrypted to form encrypted signature data block 950. Although FIG. 9 depicts three specific pieces of data being combined to form signature data block 940 (e.g., checksum 910, copy of PE header 920 and MAC address 930), it should be understood that greater or fewer pieces of data relating to the executable file and/or the computer system executing the executable file may be included in signature data block 940. Accordingly, in one embodiment, security may be increased by increasing the number of elements, or alternatively decreased by decreasing the number of elements.

Thereafter, heavy heartbeat data packet 970 is generated by combining heavy encrypted signature data block 950, heartbeat indicator data block 960, and encrypted signature data block resource 965 (e.g., 670). In one embodiment, heavy heartbeat indicator data block 960 is read upon receipt (e.g., by the driver receiving the heartbeat) and used to distinguish between a light and a heavy heartbeat (e.g., by a 32-bit identifier indicating a heavy heartbeat).

Figure 10:
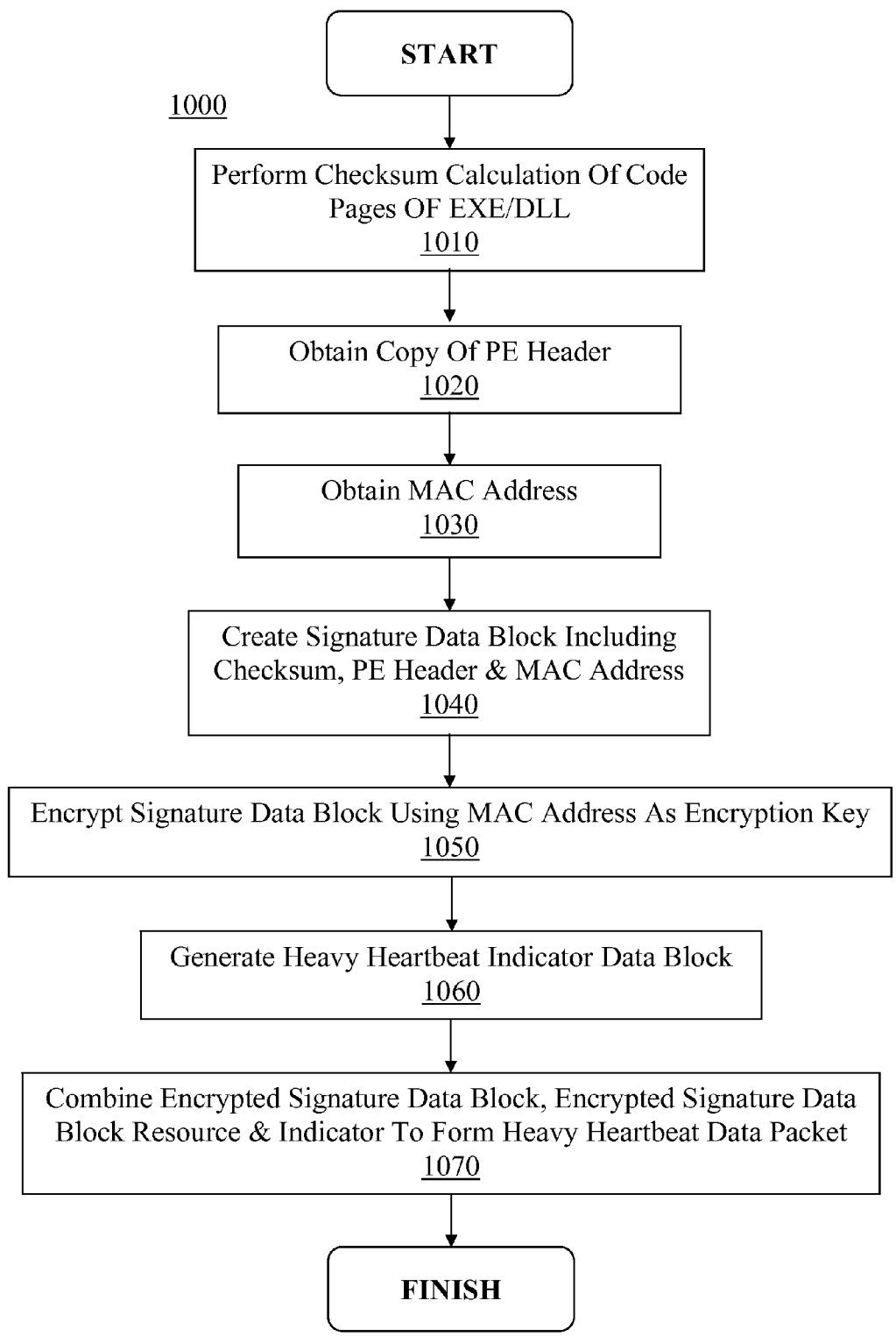
FIG. 10 shows a computer-implemented process for generating a heavy heartbeat data packet in accordance with one embodiment of the present invention.

FIG. 10 shows computer-implemented process 1000 for generating a heavy heartbeat data packet in accordance with one embodiment of the present invention. As shown in FIG. 10, steps 1010 through 1050 are analogous to those performed in steps 835 through 855 of FIG. 8B to generate an encrypted signature data block (e.g., 950). Although the MAC address may be included within, and used as the encryption key for, the encrypted signature data block in one embodiment, other computer-system identifiers may be used in other embodiments. And in another embodiment, the computer-system identifier used with respect to the digital signing procedure may be used to generate a heavy heartbeat in accordance with process 1000.

As shown in FIG. 10, a heavy heartbeat indicator data block (e.g., 960) is generated in step 1060. Thereafter in step 1070, the encrypted signature data block (e.g., 950) is combined with the heavy heartbeat indicator block and the encrypted signature data block resource (e.g., 965) to form a heavy heartbeat data packet (e.g., 970).

Figure 11:
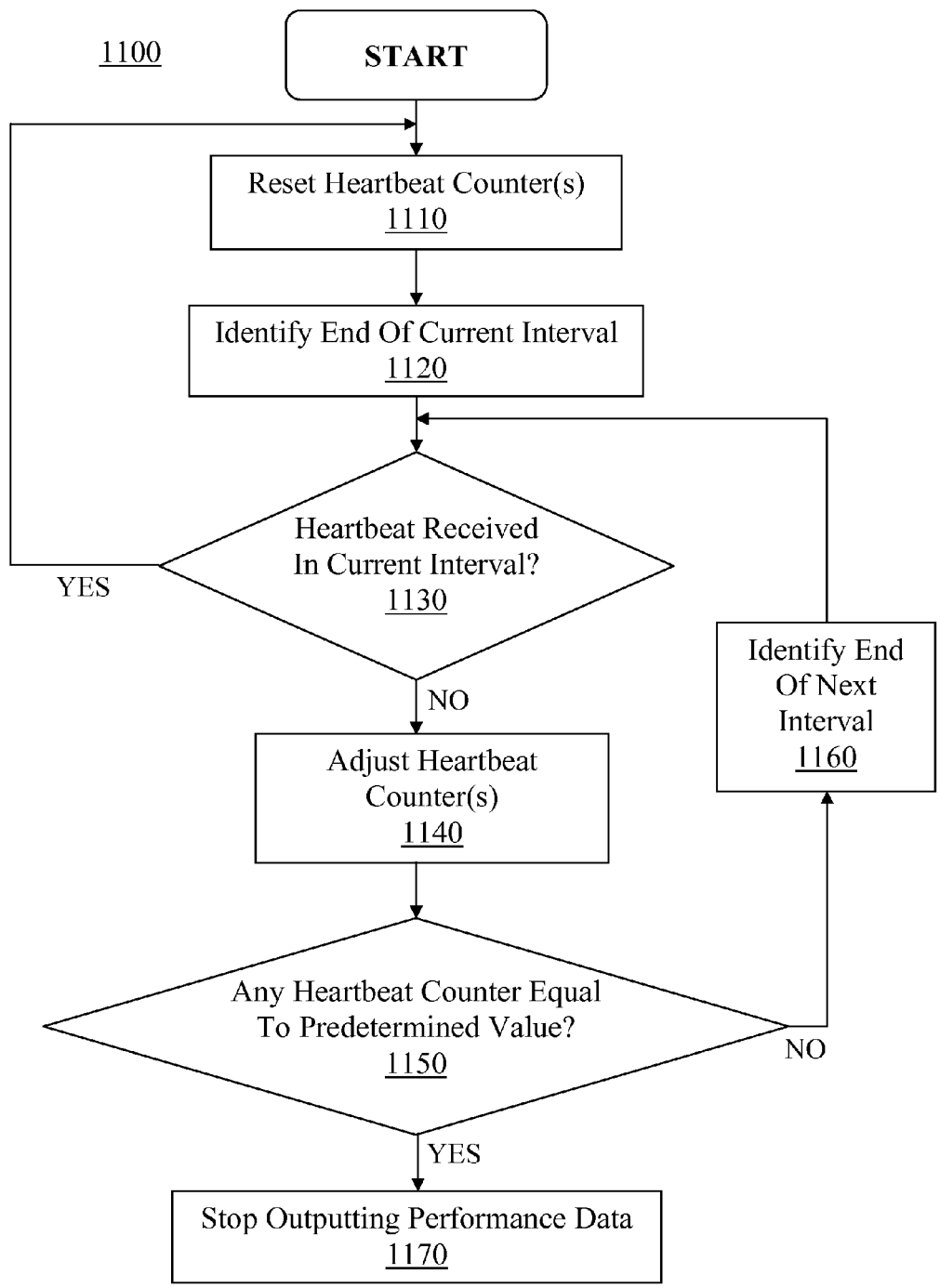
FIG. 11 shows a computer-implemented process for determining the authorization status of an executable file based on receipt of a heartbeat data packet in accordance with one embodiment of the present invention.

FIG. 11 shows computer-implemented process 1100 for determining the authorization status of an executable file based on receipt of a heartbeat data packet in accordance with one embodiment of the present invention. As such, embodiments provide a mechanism to track the receipt of heartbeats to maintain the authorized status of an executable file. In one embodiment, a counter is used within a driver layer to enable receipt of heartbeats and control over the release of performance data.

As shown in FIG. 11, a heartbeat counter is reset in step 1110 in accordance with one embodiment of the present invention. In one embodiment, a heartbeat counter may track receipt of light heartbeats, and be reset accordingly (e.g., reset to determine if a light heartbeat is received within 10 intervals). In one embodiment, a heartbeat counter may track receipt of heavy heartbeats, and be reset accordingly (e.g., reset to determine if a heavy heartbeat is received within 170 intervals).

After being reset, the end of a current periodic interval is identified in step 1120. In one embodiment, the periodic interval may be a function of the occurrence of a video frame (e.g., every frame, every other frame, every three frames, etc.). And in another embodiment, the periodic interval may be a function of a graphical rendering operation (e.g., every five rendering operations, upon each occurrence of a specific rendering operation, etc.). And in another embodiment, the periodic interval may be a function of the occurrence of a video frame for applications utilizing the Direct3D API. And in another embodiment, the periodic interval may be a function of the occurrence of a graphical rendering operation for applications utilizing the OpenGL API.

Upon identifying the end of a periodic interval, a determination is made in step 1130 as to whether a heartbeat (e.g., heavy or light) was received in the current interval. In one embodiment, process 1200 discussed below with respect to FIG. 12 may be used to make the determination in step 1130. In one embodiment, if a heartbeat was received in the current interval, then step 1110 is repeated and the counter is reset. If a heartbeat was not received in the current interval, then the counter or counters may be adjusted (e.g., decremented or incremented) in step 1140.

As shown in FIG. 11, step 1150 involves a determination as to whether the heartbeat counter is equal to a predetermined value. Although a predetermined counter limit is depicted in FIG. 11, it should be understood that in other embodiments other limits may be used (e.g., a limit determined dynamically by an application, a computer system performing process 1100, etc.). Accordingly, in one embodiment, if the counter is not equal to the counter limit, then the end of the next periodic interval is identified in step 1160. In one embodiment, if each counter (e.g., light heartbeat counter and heavy heartbeat counter) is not equal to the respective counter limit, then the end of the next periodic interval is identified in step 1160. However, if any heartbeat counter has reached the counter limit in step 1150, then performance data will not be output in step 1170. As such, in one embodiment, any application program generating heartbeats received in accordance with process 1100 must be reauthorized after step 1170 to regain access to performance information.

Figure 12:
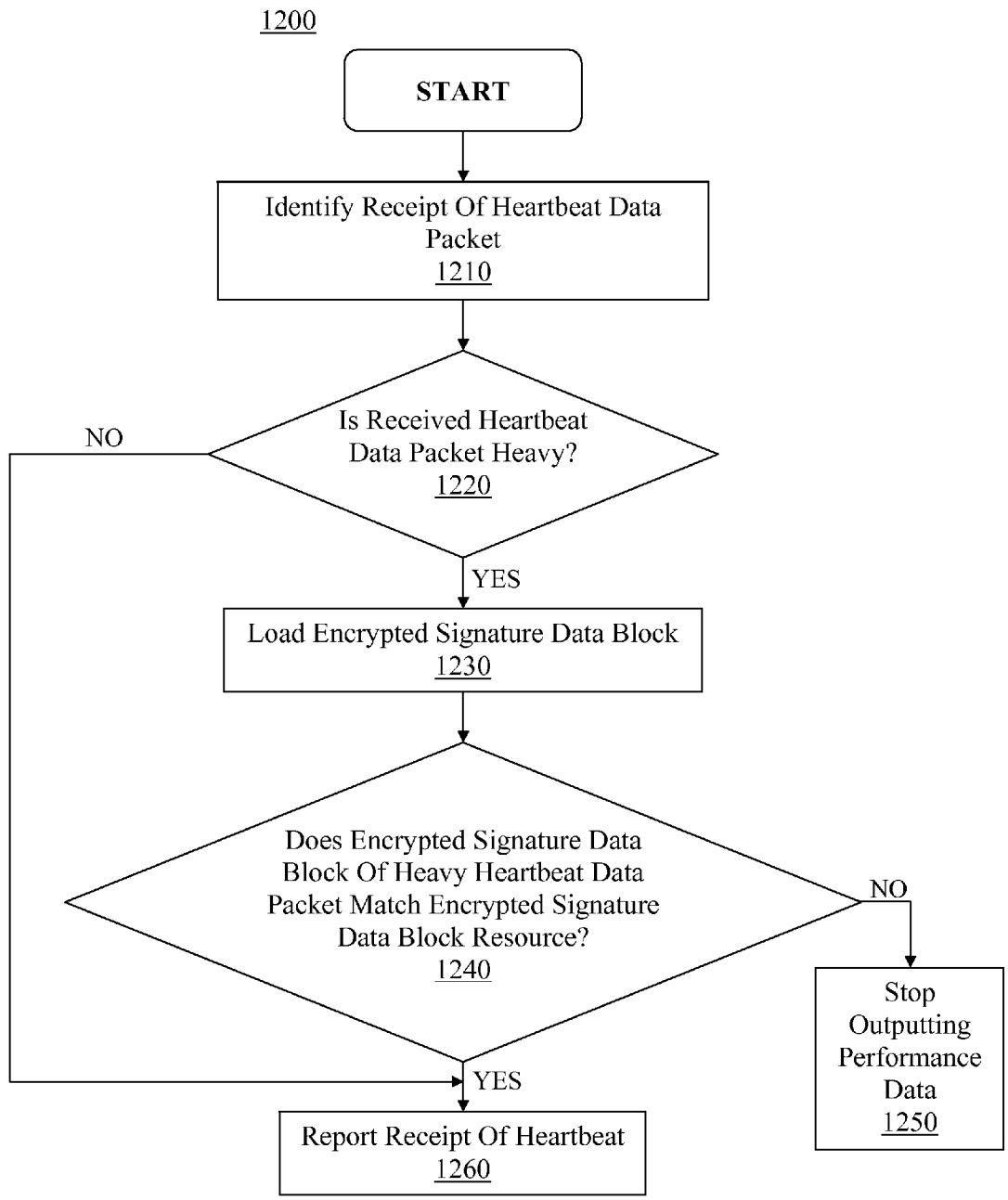
FIG. 12 shows a computer-implemented process for determining the authorization status of an executable file based on receipt of a heartbeat data packet in accordance with one embodiment of the present invention.

FIG. 12 shows computer-implemented process 1200 for determining the authorization status of an executable file based on receipt of a heartbeat data packet in accordance with one embodiment of the present invention. In one embodiment, process 1200 may be utilized in process 1100 (e.g., in step 1130) for determining if a heartbeat was received in a periodic interval. In one embodiment, a heartbeat received by process 1200 may be a heavy heartbeat (e.g., as generated by process 1100). In another embodiment, process 1200 may receive a light heartbeat. As such, in one embodiment, a light heartbeat may consist of a light heartbeat indicator data block (e.g., a 32-bit identifier indicating a light heartbeat).

As shown in FIG. 12, step 1210 involves the identification of a received heartbeat data packet. In one embodiment, a cursory inspection is performed to ensure that the data packet received is a valid light or heavy heartbeat as opposed to another data block or packet. After identifying that a heartbeat has been delivered, a determination is made in step 1220 as to whether the heartbeat is heavy or light. In one embodiment, a mechanism may perform the determination by reading the heartbeat indicator data block (e.g., 960). In another embodiment, the received heartbeat may be parsed to determine if it contains data in addition to the indicator block to indicate that the heartbeat is heavy. In another embodiment, if it is determined that a light heartbeat is received, then the receipt of a heartbeat is reported in step 1260. However, if it is determined in step 1220 that the received heartbeat is heavy, then step 1230 is performed in another embodiment.

Step 1230 of process 1200 involves loading an encrypted signature data block. In one embodiment, the encrypted signature data block (e.g., that written to the executable file as a resource in step 760 of FIG. 7 during the digital signing procedure) is read from the executable file and loaded into memory. In another embodiment, the encrypted signature data block (e.g., 965) is read and loaded from the heavy heartbeat packet itself (e.g., 970). After loading the encrypted signature data block, a determination is made in step 1240 as to whether the loaded encrypted signature data block matches a portion of the heavy heartbeat (e.g., 950) identified in step 1210. In one embodiment, if the two data blocks do not match, then output of performance data is ceased in step 1250. In another embodiment, if the two data blocks are found to match, then the receipt of a heartbeat is reported. In one embodiment, the report is made to a driver at a driver level such that the driver may adjust a counter (e.g., that discussed with respect to FIG. 11) accordingly.

Figure 13:
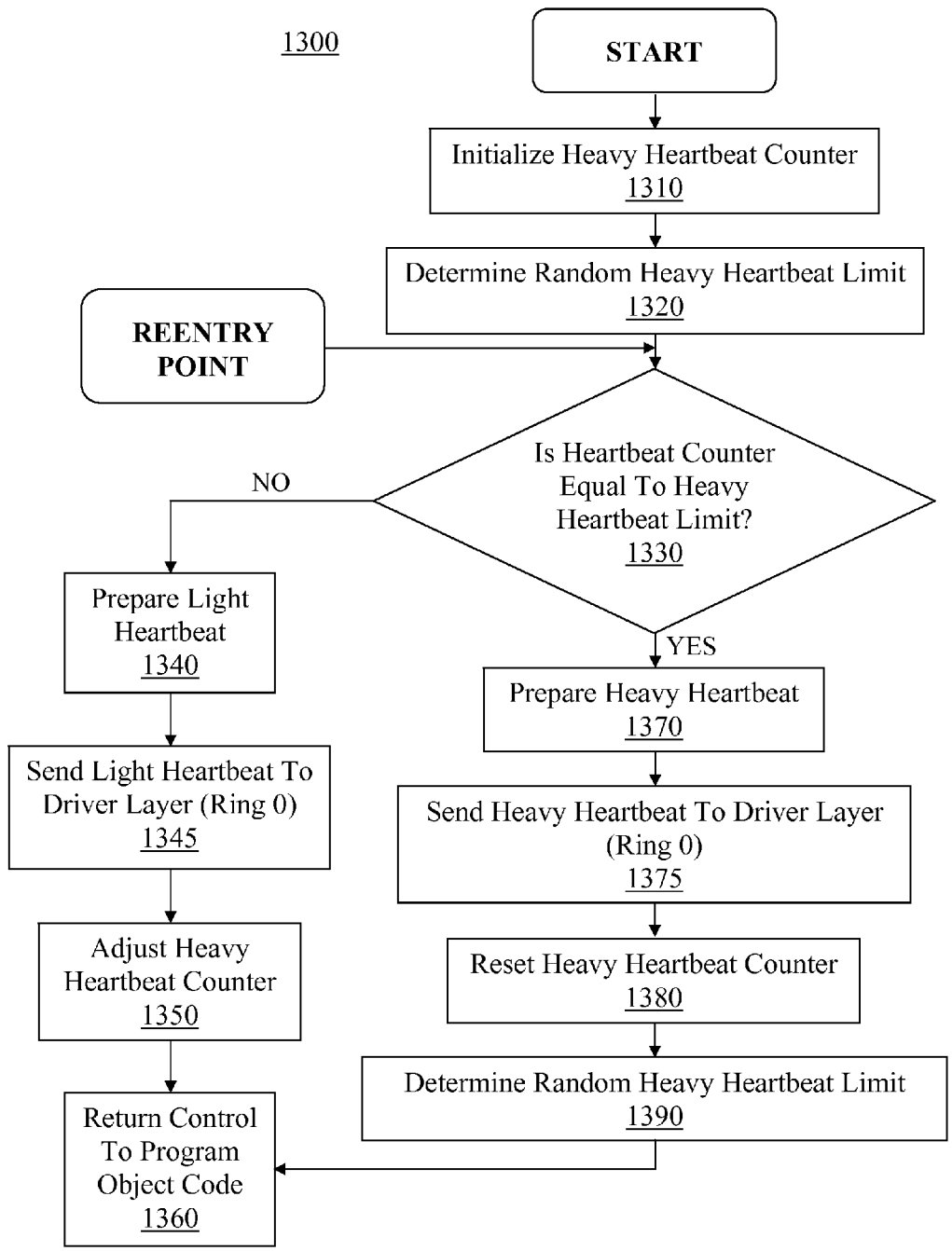
FIG. 13 shows a computer-implemented process for sending heartbeat data packets to determine the authorization status of an executable file in accordance with one embodiment of the present invention.

FIG. 13 shows computer-implemented process 1300 for sending heartbeat data packets to determine the authorization status of an executable file in accordance with one embodiment of the present invention. In one embodiment, process 1300 may be carried out in an application layer (e.g., 420) by an application program (e.g., 410) within an executable file during execution of the executable file. In another embodiment, process 1300 may be used to send heartbeat packets to a driver (e.g., 430) in a driver layer (e.g., 440). In another embodiment, heartbeat data packets generated and sent by process 1300 may be received and analyzed (e.g., according to process 1100 and/or 1200) to determine the authorization status of an executable file.

As shown in FIG. 13, step 1310 involves initializing a heavy heartbeat counter in step 1310. In one embodiment, the heavy heartbeat counter counts the number of light heartbeats sent in between the sending of a heavy heartbeat. After the heavy heartbeat counter is reset, a random heavy heartbeat limit is determined in step 1320. In one embodiment, the limit is randomly chosen from values in a predefined range.

After determining a heavy heartbeat limit, a determination is made in step 1330 as to whether the heavy heartbeat counter is equal to the heavy heartbeat limit determined in step 1320. In one embodiment, if the heavy heartbeat counter is not equal to the heavy heartbeat limit, then a light heartbeat is prepared in step 1340. In one embodiment, the light heartbeat prepared in step 1340 is generated by creating a data block (e.g., a 32-bit identifier) to indicate a light heartbeat.

After generating the light heartbeat, a light heartbeat is sent to a driver level step 1345. In one embodiment, the light heartbeat is transferred to a driver utilizing a process (e.g., processes 1100 and 1200) to identify the receipt of a heartbeat. In one embodiment, a heartbeat may be sent using an ExtEscape function call from the Microsoft Windows API. In one embodiment, the need to send a light heartbeat may be a function of the occurrence of a video frame. In another embodiment, a need to send a light heartbeat may be a function of the occurrence of a graphical rendering operation.

As shown in FIG. 13, the heavy heartbeat counter is then adjusted (e.g., decremented or incremented) in step 1350 after sending a light heartbeat. In one embodiment, control is then returned to the program object code (e.g., 110) in step 1360, thereby allowing the executable file to execute in an authorized manner until the next heartbeat call is made. Accordingly, in one embodiment, a heartbeat call causes process 1300 to resume at the reentry point and repeat step 1330.

Once the heartbeat counter equals the heartbeat limit in step 1330, a heavy heartbeat is generated in step 1370. In one embodiment, the heavy heartbeat is generated analogously to that in FIGS. 9 and 10. Thereafter, in one embodiment, the heavy heartbeat is sent to a driver level for identification and analysis in step 1375. In one embodiment, the heavy heartbeat is transferred to a driver utilizing a process (e.g., processes 1100 and 1200) to identify the receipt of a heartbeat.

After sending the heavy heartbeat, the heavy heartbeat counter is reset in step 1380. In one embodiment, another random heavy heartbeat limit is determined in step 1390. Thereafter, in one embodiment, control is returned to the program object code (e.g., 110) in step 1360, thereby allowing the executable file to execute in an authorized manner until the next heartbeat call is made. Accordingly, in one embodiment, a heartbeat call causes process 1300 to resume at the reentry point and repeat step 1330.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. Accordingly, the specification and drawings are to be regarded in an illustrative rather than a restrictive sense.

What is claimed is:

1. A computer-implemented method of verifying object code, said method comprising:

linking program object code with a plurality of data blocks, wherein said linking creates linked object code and an associated map file;

executing using a computer system, an authorization of said linked object code upon execution of said linked object code, wherein said executing an authorization comprises performing a plurality of comparisons of said linked object code with said associated map file to enable access to data associated with said program object code, wherein said performing a plurality of comparisons comprises comparing at least one of said plurality of data blocks with said associated map file;

responsive to a determination of a portion of a portable executable header and said associated map file both specifying a same data and code sections, comparing a location associated with a reserved data block within said linked object code and a location within said associated map file;

responsive to said locations of said reserved data block and said associated map file matching, determining whether function object codes are present in said associated map file and enabling access to data associated with said program object code.

2. The method of claim 1, wherein at least one of said plurality of comparisons is performed at a driver layer.

3. The method of claim 1, wherein said plurality of comparisons comprises comparisons of time signatures of said program object code.

4. The method of claim 1, further comprising disabling access to data associated with said program object code if any of said plurality of comparisons fails.

5. A computer-implemented method of authorizing object code, said method comprising:

linking program object code with a plurality of function object codes, wherein said linking produces linked object code; and performing, using a computer system, a digital signing procedure of said linked object code comprising:

creating a first signature data block comprising information about said linked object code and a computer-system identifier of a computer system authorized to operate said linked object code, wherein said information comprises a digest of said linked object code and a redundancy check of a plurality of code pages of said linked object code;

encrypting said first signature data block;

writing said first encrypted signature data block to said linked object code to create a digitally-signed object code;

comparing said first encrypted signature data block to an executed file to determine if a digitally-signed object code is authorized, wherein said determination is based on a memory location where said plurality of function object codes is executing and whether said memory location relates to one of said plurality of code pages; and enabling and disabling access to data associated with said program object code responsive to said determination.

6. The method of claim 5, wherein said executed file is a second encrypted signature data block, wherein said second encrypted signature data block comprises information about said linked object code and a computer-system identifier of a computer system performing operations on said executed file.

7. The method of claim 6, wherein said comparing is executed at a driver layer.

8. The method of claim 5, wherein said comparing further comprises:
   determining a location in a memory where said plurality of said function object codes is executing; and
   reading said digest of said linked object code to determine if said location relates to one of said plurality of code pages.

9. The method of claim 5, wherein said performing a digital signing procedure further comprises modifying an insertion point of said plurality of said function object codes such that said plurality of said function object codes execute prior to any portions of said linked program object code.

10. The method of claim 5, wherein said performing a digital signing procedure further comprises:
    performing a redundancy check on said first encrypted signature data block, wherein said redundancy check produces a first checksum; and
    writing said first checksum to said linked object code.

11. The method of claim 10, further comprising:
    reading said first encrypted signature data block from said linked object code;
    performing a redundancy check on said first encrypted signature data block read from said linked object code, wherein said redundancy check produces a second checksum; and
    determining that said linked object code is not authorized if said first checksum and said second checksum do not match.

12. A non-transitory computer-readable storage medium having computer-readable program code embodied therein for causing a computer system to perform a method of verifying object code, said method comprising:
    linking program object code with a plurality of data blocks, wherein said linking creates linked object code and an associated map file;
    executing an authorization of said linked object code upon execution of said linked object code, wherein said executing an authorization comprises performing a plurality of comparisons of said linked object code with said associated map file wherein said authorization inables access to data associated with said program object code, wherein said plurality of comparisons comprises comparing at least one of said plurality of data blocks with said associated map file;
    responsive to a determination of a portion of said portable executable header and said associated map file both specifying the same data and code sections, comparing a location associated with a reserved data block within said linked object code and a location within said associated map file;
    responsive to said locations of said reserved data block and said associated map file matching, determining whether function object codes are present in said associated map file and enabling access to data associated with said program object code.

13. The non-transitory computer-readable medium of claim 12, wherein at least one of said plurality of comparisons is performed at a driver layer.

14. The non-transitory computer-readable medium of claim 12, wherein said plurality of comparisons comprises comparisons of time signatures of said program object code.

15. The non-transitory computer-readable storage medium of claim 12, further comprising disabling access to data associated with said program object code if any of said plurality of comparisons fails.

16. A non-transitory computer-readable storage medium having computer-readable program code embodied therein for causing a computer system to perform a method of authorizing object code, said method comprising:
    linking program object code with a plurality of function object codes, wherein said linking produces linked object code;
    performing a digital signing procedure of said linked object code comprising:
        creating a first signature data block comprising information about said linked object code and a computer-system identifier of a computer system authorized to operate said linked object code, wherein said information comprises a digest of said linked object code and a redundancy check of a plurality of code pages of said linked object code;
        encrypting said first signature data block;
        writing said first encrypted signature data block to said linked object code to create a digitally-signed object code;
        comparing said first encrypted signature data block to an executed file to determine if a digitally-signed object code is authorized, wherein said determination is based on a memory location where said plurality of function object codes is executing and whether said memory location relates to one of said plurality of code pages; and
        enabling and disabling access to data associated with said program object code responsive to said determination.

17. The non-transitory computer-readable storage medium of claim 16, wherein said executed file is a second encrypted signature data block, wherein said second encrypted signature data block comprises information about said linked object code and a computer-system identifier of a computer system performing operations on said executed file.

18. The non-transitory computer-readable storage medium of claim 17, wherein said comparing is executed at a driver layer.

19. The non-transitory computer-readable storage medium of claim 16, wherein said comparing further comprises:
    determining a location in a memory where said plurality of said function object codes is executing; and
    reading said digest of said linked object code to determine if said location relates to one of said plurality of code pages.

20. The non-transitory computer-readable medium of claim 16, wherein said performing a digital signing procedure further comprises modifying an insertion point of said plurality of said function object codes such that said plurality of said function object codes execute prior to any portions of said linked program object code.

21. The non-transitory computer-readable storage medium of claim 16, wherein said performing a digital signing procedure further comprises:
    performing a redundancy check on said first encrypted signature data block, wherein said redundancy check produces a first checksum; and
    writing said first checksum to said linked object code.

22. The non-transitory computer-readable storage medium of claim 21, further comprising:
    reading said first encrypted signature data block from said linked object code;
    performing a redundancy check on said first encrypted signature data block read from said linked object code, wherein said redundancy check produces a second checksum; and determining that said linked object code is not authorized if said first checksum and said second checksum do not match.

* * * * *